US008041204B2

(12) United States Patent
Nomura

(10) Patent No.: US 8,041,204 B2
(45) Date of Patent: *Oct. 18, 2011

(54) MECHANISM FOR CONTROLLING POSITION OF OPTICAL ELEMENT

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 12/263,710

(22) Filed: Nov. 3, 2008

(65) Prior Publication Data

US 2009/0125926 A1    May 14, 2009

(30) Foreign Application Priority Data

Nov. 9, 2007 (JP) .................................. 2007-291657
Jul. 4, 2008 (JP) .................................. 2008-175178

(51) Int. Cl.
*G03B 17/00* (2006.01)

(52) U.S. Cl. .......................................... 396/75; 359/813

(58) Field of Classification Search ..................... 396/75, 396/89, 90, 94; 359/811, 813
See application file for complete search history.

(56) References Cited

U.S. PATENT DOCUMENTS

| 4,857,794 | A | * | 8/1989 | Watanabe | ..................... | 313/113 |
| 2003/0081325 | A1 | | 5/2003 | Nomura et al. | | |
| 2004/0051969 | A1 | | 3/2004 | Nomura | | |
| 2004/0141737 | A1 | | 7/2004 | Nomura | | |
| 2004/0151490 | A1 | | 8/2004 | Nomura | | |
| 2005/0286352 | A1 | * | 12/2005 | Inui | ............................ | 369/44.11 |
| 2006/0274435 | A1 | | 12/2006 | Nomura et al. | | |
| 2007/0019304 | A1 | | 1/2007 | Nomura | | |

FOREIGN PATENT DOCUMENTS

| JP | 7-140368 A | 6/1995 |
| JP | 2000-206391 | 7/2000 |
| JP | 2004-240360 A | 8/2004 |
| JP | 2007-133262 A | 5/2007 |

OTHER PUBLICATIONS

English machine translation of Tanaka, JP 07-140368.*
English machine translation of Tanaka, JP 07-140368, Jun. 2, 2005. (Sent previous in the Action dated Jun. 24, 2010. Included presently to correct the omission of the date of the NPL.).*
English language Abstract of JP 2000-206391, Jul. 28, 2000.
U.S. Appl. No. 12/263,494 to Nomura, which was filed on Nov. 3, 2008.
U.S. Appl. No. 12/263,694 to Nomura, which was filed on Nov. 3, 2008.
English language Abstract of JP 2004-240360 A, Aug. 26, 2004.
English language Abstract of JP 7-140368 A, Jun. 2, 1995.
English language Abstract of JP 2007-133262 A, May 31, 2007.

* cited by examiner

*Primary Examiner* — Clayton E Laballe
*Assistant Examiner* — Autumn Parker
(74) *Attorney, Agent, or Firm* — Greenblum & Bernstein P.L.C.

(57) ABSTRACT

An optical element position control mechanism includes an optical element holding member which holds an optical element of a photographing system; an advancing/retracting movement guide member which guides the optical element holding member in an optical axis direction of the photographing system to be movable in the optical axis direction; and a biasing device including an arm, the arm being swingable about a swing axis which is substantially orthogonal to the optical axis and being engaged with the optical element holding member. The biasing device simultaneously exerts via the arm both a biasing force in a direction of movement of the optical element holding member that is guided by the advancing/retracting movement guide member and a biasing force in a direction orthogonal to the direction of movement of the optical element holding member on the optical element holding member.

15 Claims, 26 Drawing Sheets

MECHANISM FOR CONTROLLING POSITION OF OPTICAL ELEMENT

BACKGROUND OF THE INVENTION

1. Field of the Invention

The present invention relates to a mechanism for controlling the position of an optical element which is moved in an optical axis direction in an optical apparatus.

2. Description of the Related Art

In optical apparatuses such as cameras, a mechanism in which a guide shaft is inserted into a guide hole to be freely slidable relative to the guide hole with the lengthwise direction of the guide shaft being parallel to an optical axis, and another mechanism wherein a guide projection is engaged in a guide groove to be freely slidable relative to the guide groove with the lengthwise direction of the guide groove being parallel to an optical axis, are known in the art as an advancing/retracting movement guide mechanism for moving an optical element holding member which supports an optical element such as a lens group in an optical axis direction. The former type of guide mechanism which includes the guide shaft and the guide hole is disclosed in, e.g., Japanese Unexamined Patent Publication 2000-206391.

In aforementioned type of guide mechanisms, at each of the slidable portions between the guide hole and the guide shaft and between the guide groove and the guide projection, a predetermined clearance is created to make relative sliding movement possible. Furthermore, measures are taken to eliminate backlash to prevent rattle and noise which may be caused by the clearance and to make stable position-control possible.

SUMMARY OF THE INVENTION

The present invention provides an optical element position control mechanism which can easily eliminate backlash in the advancing/retracting movement guide mechanism for the optical element holding member in a space-saving manner.

According to an aspect of the present invention, an optical element position control mechanism is provided, including an optical element holding member which holds an optical element of a photographing system; an advancing/retracting movement guide member which guides the optical element holding member in an optical axis direction of the photographing system to be movable in the optical axis direction; and a biasing device including an arm, the arm being swingable about a swing axis which is substantially orthogonal to the optical axis and being engaged with the optical element holding member. The biasing device simultaneously exerts via the arm both a biasing force in a direction of movement of the optical element holding member that is guided by the advancing/retracting movement guide member and a biasing force in a direction orthogonal to the direction of movement of the optical element holding member on the optical element holding member.

It is desirable for the biasing device to be a torsion spring including a coiled portion supported by a support member provided separately from the optical element holding member, a central axis of the coiled portion being substantially coincident with the swing axis; a first arm portion which constitutes the arm and extends radially outwards from the coiled portion to be engaged with the optical element holding member; and a second arm portion which extends radially outward from the coiled portion to be engaged with the support member. The torsion spring varies an amount of resilient deformation thereof in a direction of rotation about the swing axis in accordance with movement of the optical element holding member. The first arm portion extends along a swing plane defined by a swing motion thereof about the swing axis, in a force-applied state of the biasing device in which the first arm is engaged with the optical element holding member. The first arm portion is positioned outside the swing plane in a free state of the biasing device in which the first arm is disengaged from the optical element holding member. The first arm portion is resiliently deformed in a direction so as to coincide with the swing plane when the biasing device is brought into the force-applied state from the free state.

It is desirable for the arm of the biasing device to include a lever pivoted at one end thereof on a support member, that is provided separately from the optical element holding member, the other end of the lever being engaged with the optical element holding member. The biasing device includes a lever biasing member for biasing the lever in one of forward and reverse rotational directions about the swing axis. The lever extends along a swing plane defined by swing motion thereof about the swing axis, in a force-applied state of the biasing device in which the lever is engaged with the optical element holding member. The lever is positioned outside the swing plane in a free state of the biasing device in which the lever is disengaged from the optical element holding member. The lever is resiliently deformed in a direction to approach the swing plane when the biasing device is brought into the force-applied state from the free state.

It is desirable for the advancing/retracting movement guide member to include a guide shaft, an axis of which extends in the optical axis direction. The optical element holding member includes a guide hole into which the guide shaft is inserted to be slidable. The arm of the biasing device is in contact with a contacting portion in a close vicinity of the guide hole and presses the optical element holding member in a manner to cause an inner wall surface of the guide hole to press against the guide shaft.

It is desirable for the optical element holding member to include a projection which projects from the contacting portion and is positioned within a swinging range of the arm of the biasing device to receive the biasing force in the direction of movement of the optical element holding member.

It is desirable for the optical element position control mechanism to include a pressing device which presses the biasing device in a direction orthogonal to the direction of movement of the optical element holding member when the biasing device is in a force-applied state in which the arm is engaged with the optical element holding member.

It is desirable for the pressing device to include a stationary wall member positioned at least one of inside and outside the biasing device. The arm of the biasing device is in contact with the stationary wall member to be pressed in the direction orthogonal to the direction of movement of the optical element holding member.

It is desirable for the stationary wall member to include an outer wall member which is positioned outside the arm of the biasing device and presses the biasing device in a direction to approach the optical axis.

It is desirable for the stationary wall member to include an inner wall portion positioned on the inner side of the biasing spring, the inner wall portion pressing the arm of the biasing device in a direction away from the optical axis.

It is desirable for the stationary wall member to include a pressing projection which is in pressing contact with the arm of the biasing device.

It is desirable for the arm of the biasing device to be formed to bulge toward the stationary wall member so that a bent portion of the biasing device comes in contact with the stationary wall member.

It is desirable for the arm of the biasing device to include a first extending portion which extends to the bent portion toward the stationary wall member and a second extending portion which extends from the bent portion away from the stationary wall member.

It is desirable for the optical element position control mechanism to include an inner cylindrical member positioned outside the optical element holding member; and an outer wall member positioned outside the optical element holding member so as to face the outer surface of the cylindrical member. The biasing device is held between the inner cylindrical member and the outer wall member and the arm of the biasing device is in pressing contact with one of the inner cylindrical member and the outer wall member to be pressed in a direction orthogonal to the direction of movement of the optical element holding member.

It is desirable for the optical element holding member to be guided linearly without rotating about the optical axis.

It is desirable for the optical element position control mechanism to be incorporated in a photographing lens unit, the support member constituting a stationary member of the photographing lens unit.

According to the present invention, backlash in the advancing/retracting movement guide portion can be eliminated by a simple and space-saving structure made of a small number of elements because the biasing device, which biases the holding member in the optical axis direction of the optical element to move the holding member in this direction, also biases the holding member in a direction orthogonal to the direction of movement of the holding member. In addition, a greater effect on the prevention of backlash in the advancing/retracting movement guide portion can be obtained by providing the optical element position control mechanism with a device for pressing the biasing device in the force-applied state in a direction orthogonal to the direction of movement of the holding member.

The present disclosure relates to subject matter contained in Japanese Patent Application No. 2007-291657 (filed on Nov. 9, 2007) and Japanese Patent Applications No. 2008-175178 (filed on Jul. 4, 2008) which are expressly incorporated herein by reference in their entireties.

BRIEF DESCRIPTION OF THE DRAWINGS

The present invention will be described below in detail with reference to the accompanying drawings in which:

FIGS. 14A and 14B are graphs for comparison between spring load variations in the embodiment shown in FIG. 12 and spring load variations in the comparative example shown in FIG. 13, wherein FIG. 14A shows the spring load variations in the embodiment shown in FIG. 12 and FIG. 14B shows the spring load variations in the comparative example shown in FIG. 13;

DESCRIPTION OF THE PREFERRED EMBODIMENTS

Figure 1:
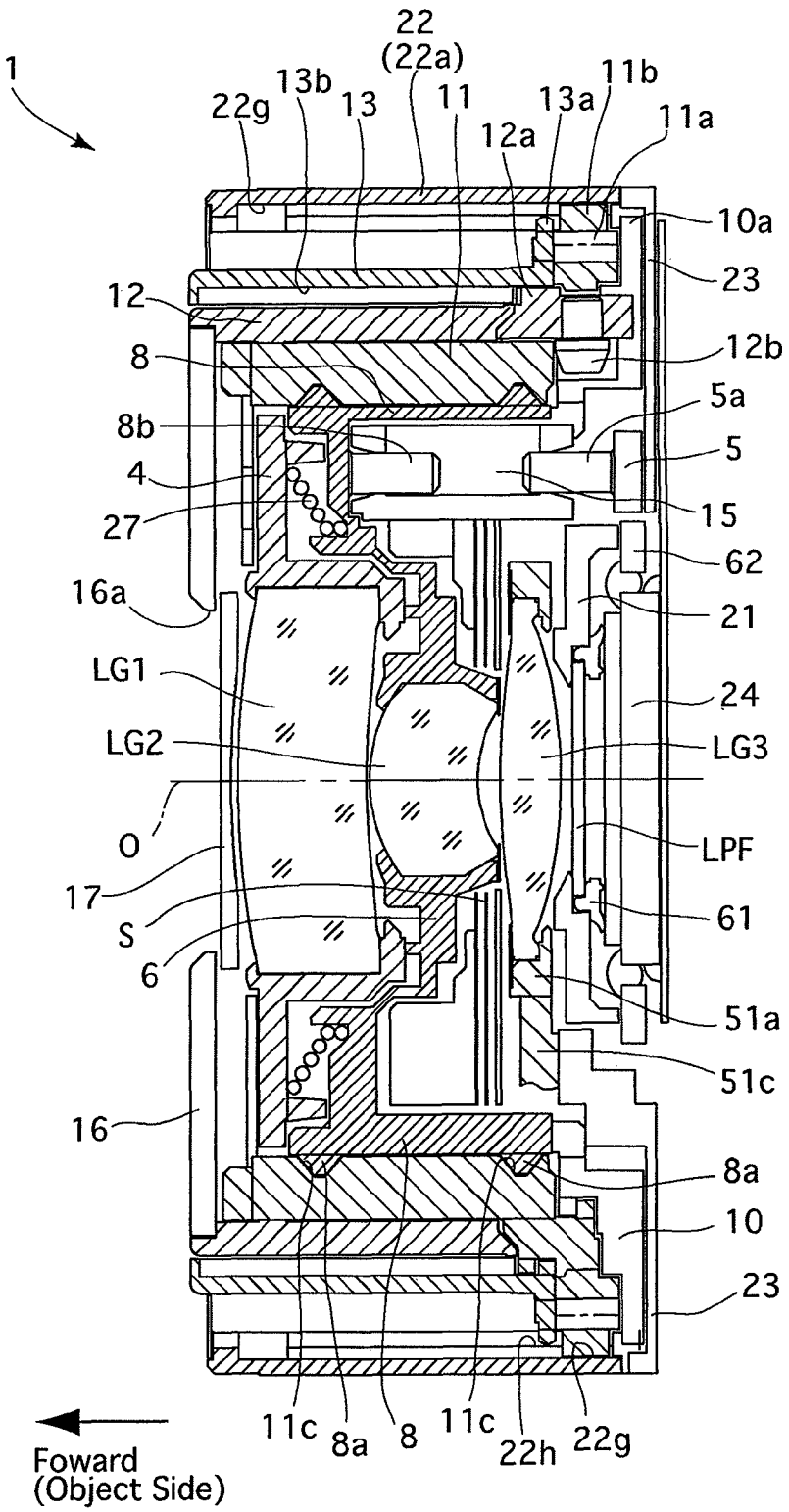
FIG. 1 is a cross sectional view of a zoom lens barrel to which a mechanism for controlling the position of an optical element according to the present invention is applied, showing the zoom lens barrel in a lens barrel accommodated state (fully retracted state)
Figure 2:
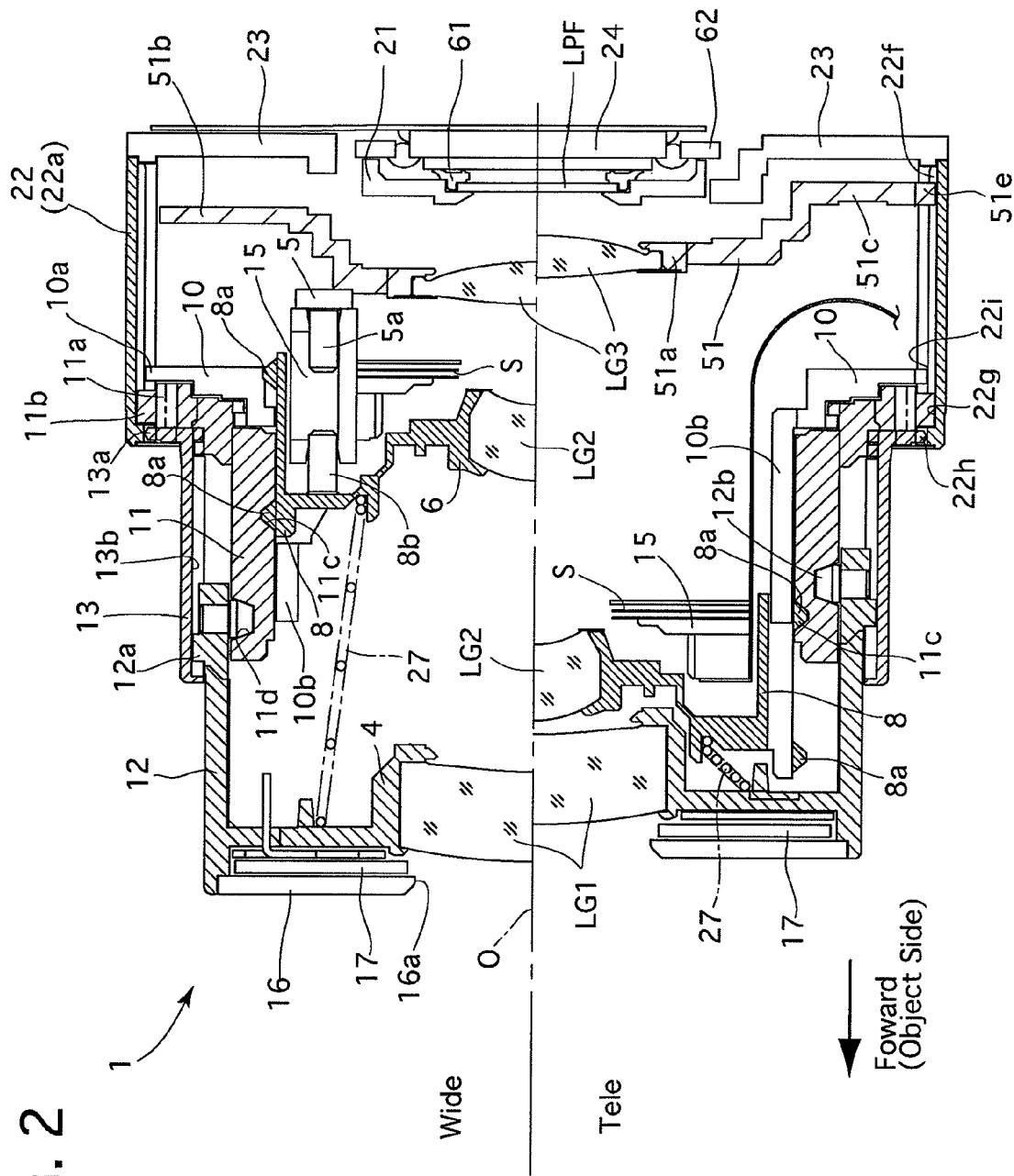
FIG. 2 is a cross sectional view of the zoom lens barrel in a ready-to-photograph state, wherein an upper half and a lower half of the zoom lens barrel shown in FIG. 2 show the zoom lens barrel set at the wide-angle extremity and the telephoto extremity, respectively.
Figure 3:
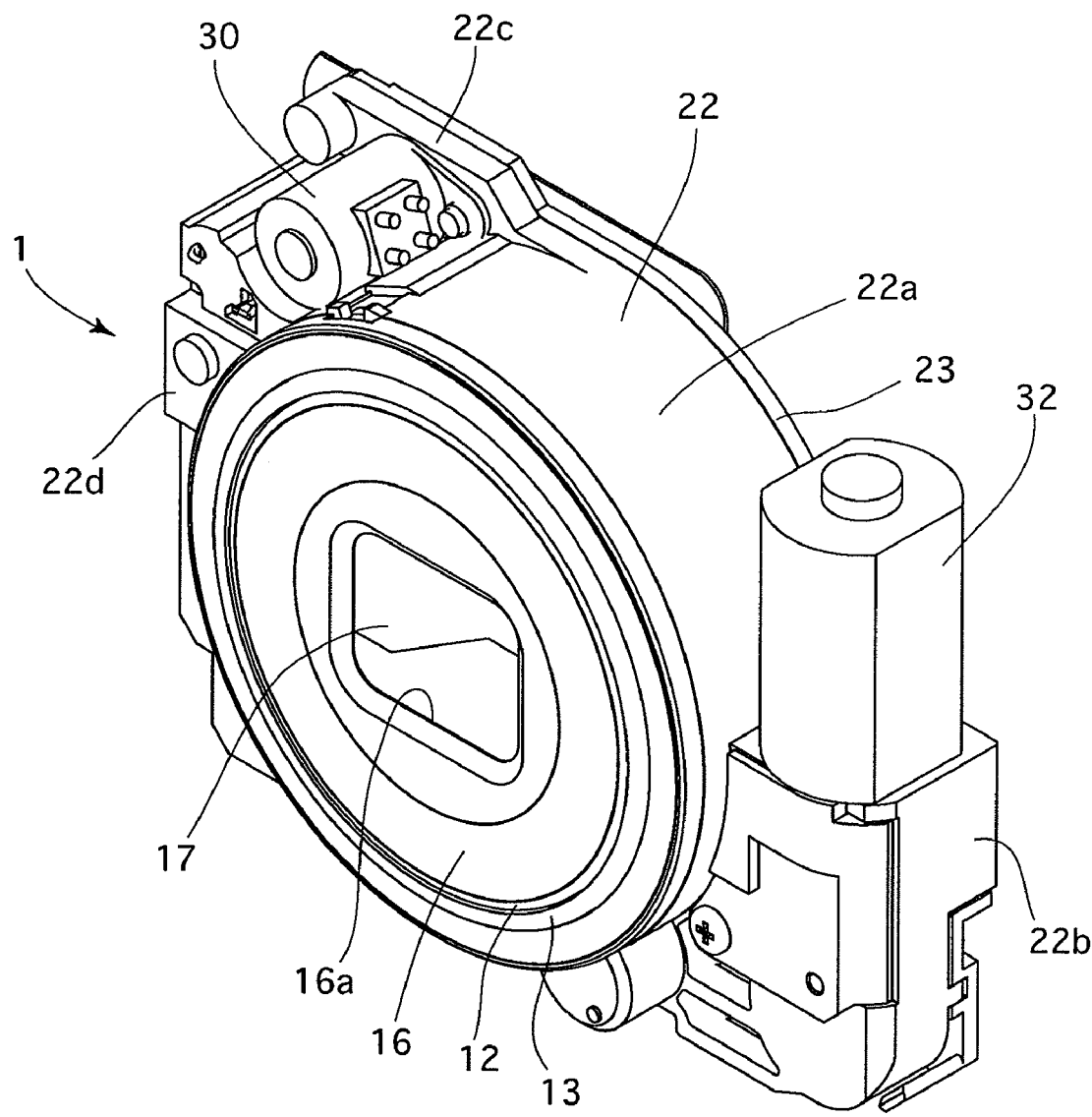
FIG. 3 is a front perspective view of the zoom lens barrel in the lens barrel accommodated state.
Figure 4:
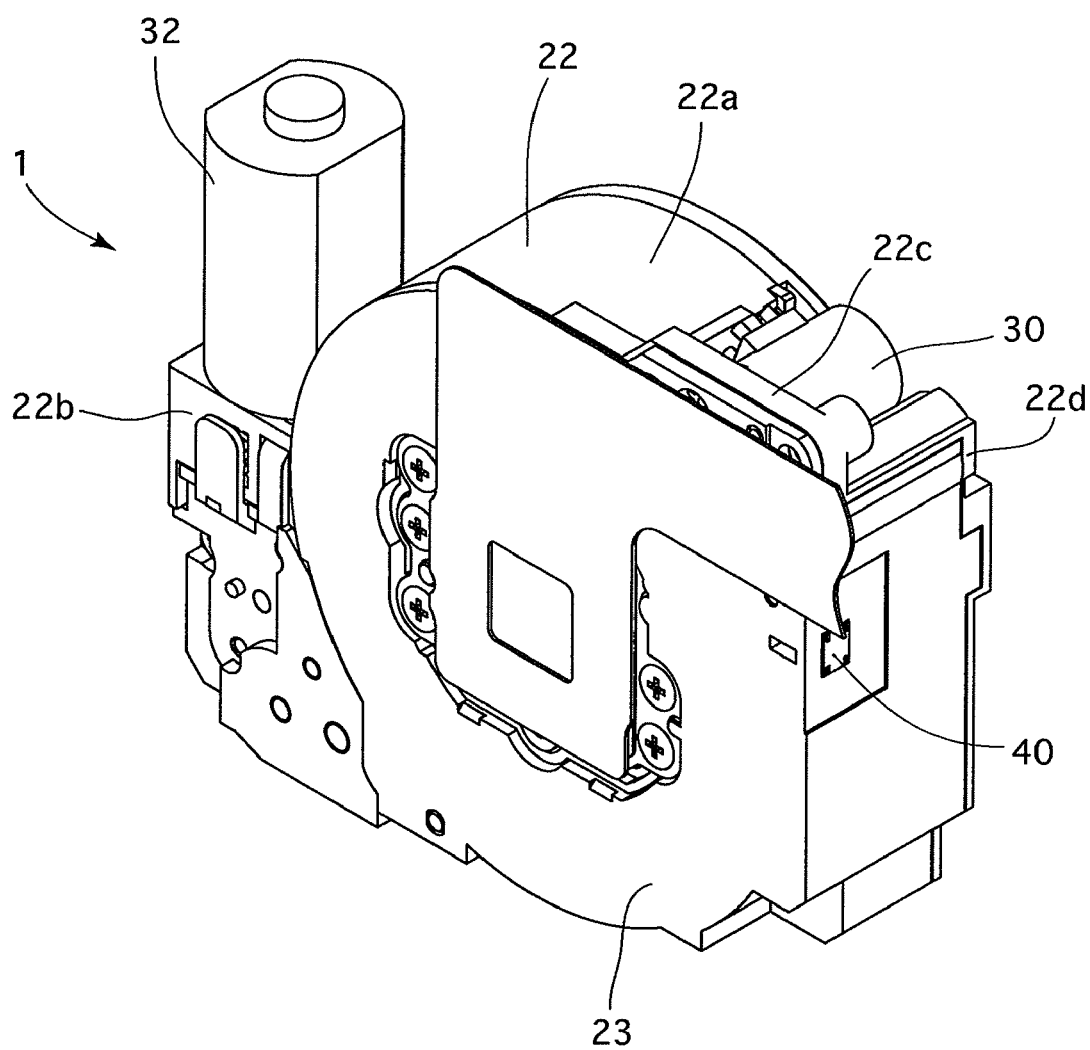
FIG. 4 is a rear perspective view of the zoom lens barrel in the lens barrel accommodated state.
Figure 5:
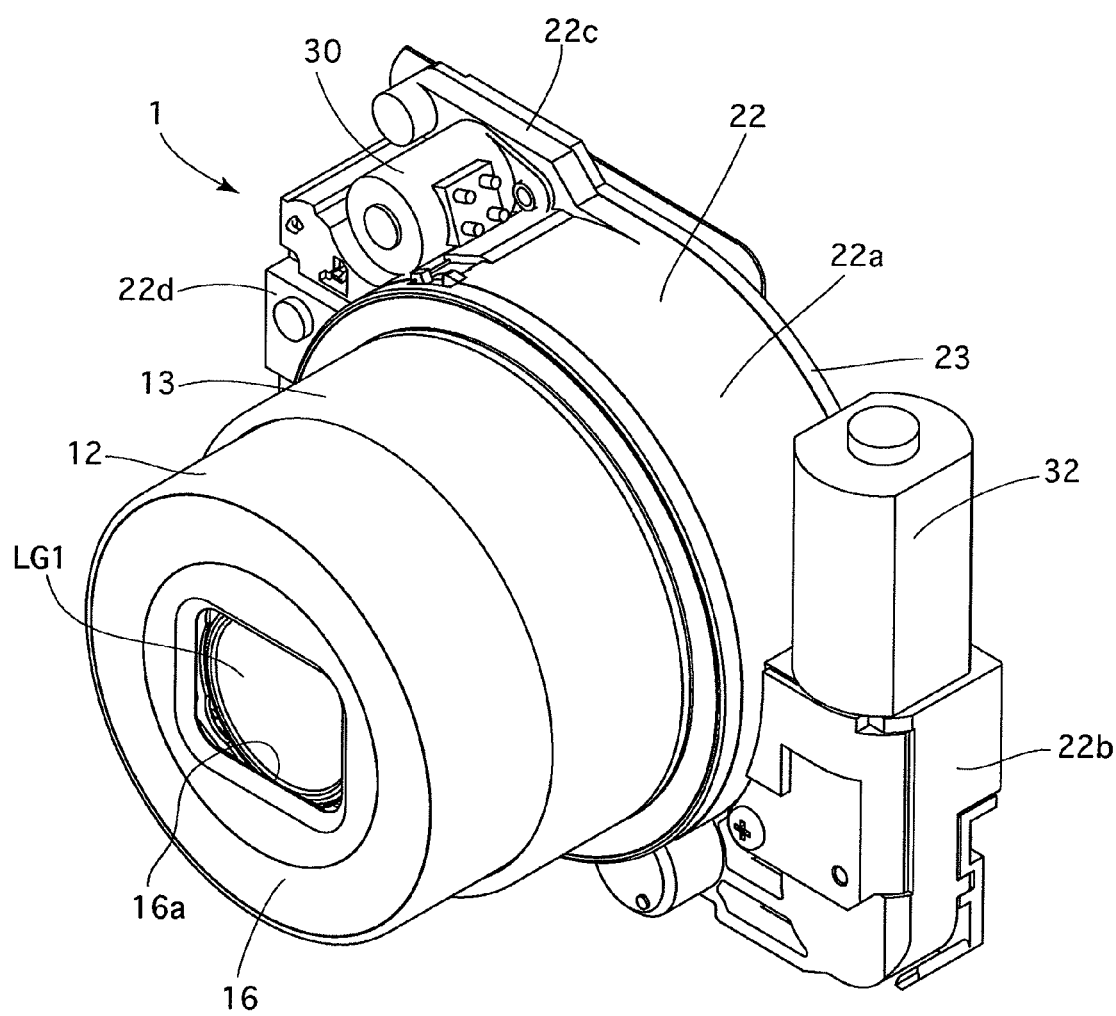
FIG. 5 is a front perspective view of the zoom lens barrel in a ready-to-photograph state.
Figure 6:
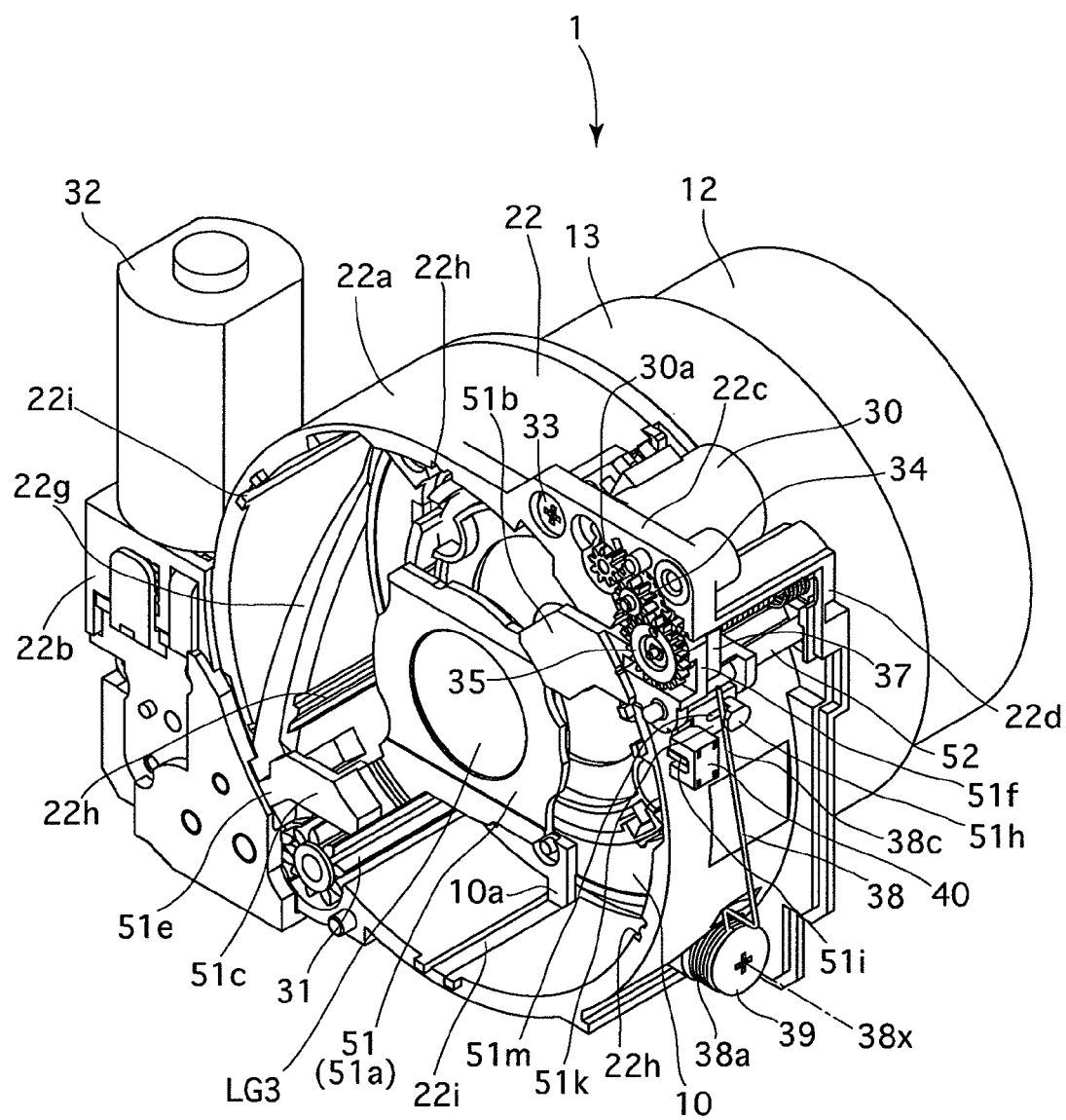
FIG. 6 is a rear perspective view of the zoom lens barrel in a ready-to-photograph state with the image-pickup device holder of the zoom lens barrel removed.

Firstly, the overall structure of a zoom lens barrel 1 to which an optical element position control mechanism according to the present invention is applied will be hereinafter discussed with reference mainly to FIGS. 1 through 7. FIGS. 1 and 2 each show a cross sectional view of the zoom lens barrel 1, FIG. 1 shows a state where the zoom lens barrel 1 is in a lens barrel accommodated state, in which no pictures are taken, an upper half of the cross sectional view in FIG. 2 shows the zoom lens barrel 1 set at the wide-angle extremity, and a lower half of the cross sectional view in FIG. 2 shows the zoom lens barrel 1 set at the telephoto extremity. FIGS. 3 and 4 are perspective views of the zoom lens barrel 1 in the lens barrel accommodated state, and FIGS. 5 and 6 are perspective views of the zoom lens barrel 1 in a ready-to-photograph state.

The zoom lens barrel 1 is provided with a photographing optical system which includes a first lens group LG1, a second lens group LG2, a set of shutter blades (mechanical shutter) S that also serves as a diaphragm, a third lens group LG3, a low-pass filter (optical filter) LPF and an image-pickup device (image sensor) 24 such as CCD or CMOS, in that order from the object side. This photographing optical system is configured as a zoom optical system. A focal-length varying operation (zooming operation) is performed by moving the first lens group LG1 and the second lens group LG2 along an optical axis O of the photographing optical system in a predetermined moving manner, and a focusing operation is carried out by moving the third lens group LG3 along the optical axis O. In the following descriptions, the expression "optical axis direction" includes the direction parallel to the optical axis O of the photographing optical system.

The zoom lens barrel 1 is provided with a housing (support member) 22 which supports the optical system from the first lens group LG1 to the third lens group LG3 inside the housing 22 to allow these lens groups to move in the optical axis direction. The zoom lens barrel 1 is provided with an image-pickup device holder 23 which is fixed to the back of the housing 22. An opening is formed in a central portion of the image-pickup device holder 23, and the image-pickup device 24 is held in the opening via an image-pickup device frame 62. A filter frame 21 which is fixed to the front of the image-pickup device holding frame 62 holds the low-pass filter LPF. A packing (sealing member) 61 for dust prevention is tightly held between the low-pass filter LPF and the image-pickup device 24. The image-pickup device frame 62 is supported by the image-pickup device holder 23 to make a tilt adjustment of the image-pickup device frame 62 relative to the image-pickup device holder 23 possible.

The housing 22 is provided around a cylindrical portion 22a thereof with a zoom motor support portion 22b, an AF mechanism mounting portion 22c and a front wall portion 22d. The cylindrical portion 22a surrounds the optical axis O, the zoom motor support portion 22b supports a zoom motor 32, the AF mechanism mounting portion 22c supports an AF motor 30, and the front wall portion 22d is positioned in front of the AF mechanism mounting portion 22c. The cylindrical portion 22a supports the aforementioned optical elements such as each lens group inside the cylindrical portion 22a and forms a substantial outer-shape of the zoom lens barrel 1. The zoom motor support portion 22b, the AF mechanism mounting portion 22c and the front wall portion 22d are positioned radially outside the cylindrical portion 22a about the optical axis O. As shown in FIGS. 3 through 7, the AF mechanism mounting portion 22c is formed in the vicinity of the rear end portion of the cylindrical portion 22a, and the rear surface portion of the AF mechanism mounting portion 22c is closed by the image-pickup device holder 23. The front wall portion 22d is formed on the housing 22 at a position forwardly away from the AF mechanism mounting portion 22c in the optical axis direction to face the AF mechanism mounting portion 22c.

Figure 10:
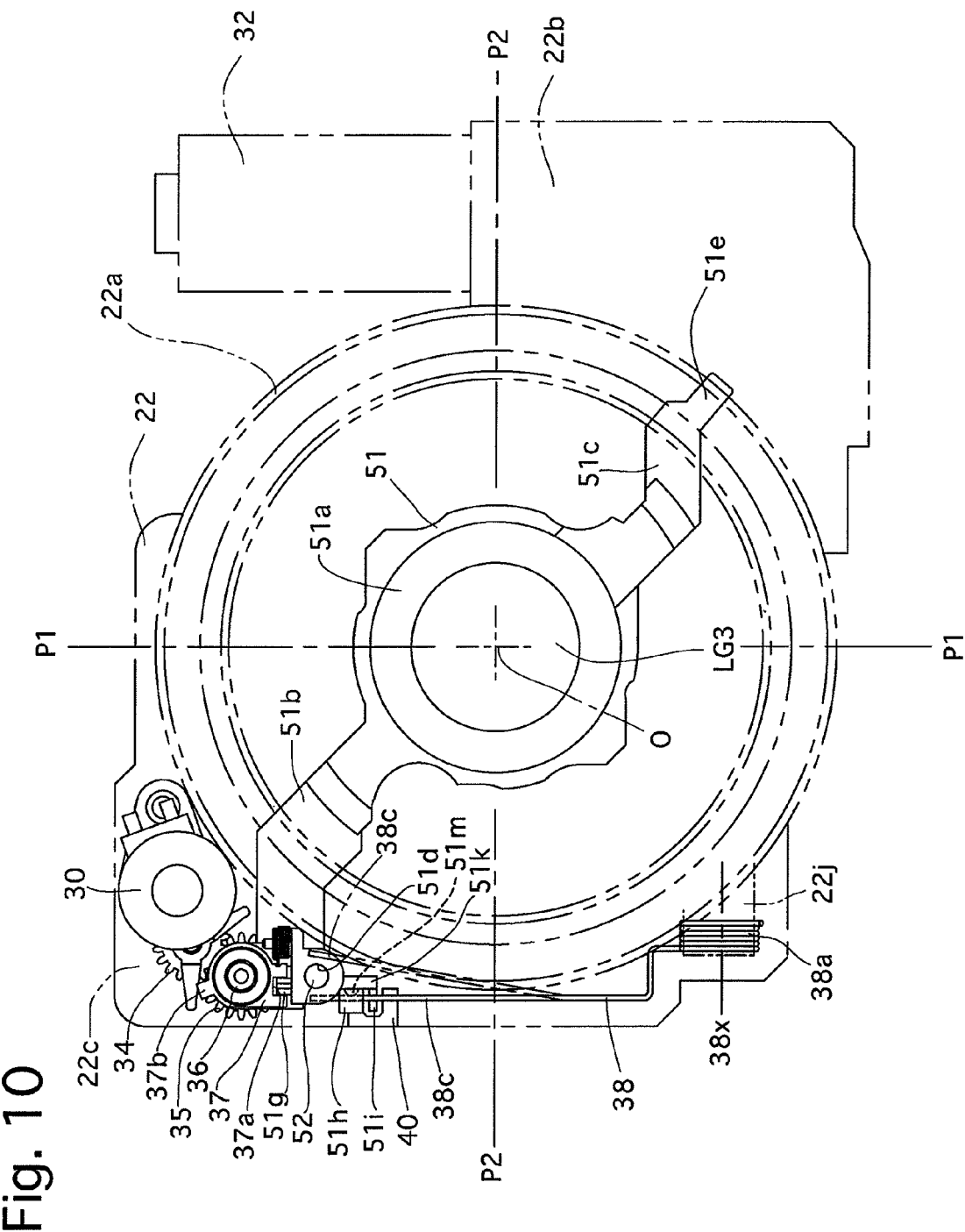
FIG. 10 is a front elevational view of the zoom lens barrel, mainly showing the third lens group frame and the position control mechanism therefor.

The zoom lens barrel 1 is provided with a third lens group frame (optical element holding member) 51 which holds the third lens group LG3. The third lens group frame 51 is provided with a pair of guide arm portions 51b and 51c which are formed to extend from a central lens holding portion 51a of the third lens group frame 51 in substantially opposite radial directions symmetrical with respect to the optical axis O. The guide arm portion 51b is provided in the vicinity of the radially outer end thereof with a pair of guide holes (front and rear guide holes which align in the optical axis direction) 51d into which a third lens group guide shaft (advancing/retracting movement guide member) 52 is inserted to be freely slidable relative to the pair of guide holes 51d. The third lens group guide shaft 52 is fixed at the front and rear ends thereof to the housing 22 and the image-pickup device holder 23, respectively. As shown in FIGS. 6 and 10, the third lens group guide shaft 52 is positioned outside the cylindrical portion 22a of the housing 22, and the front end portion of the third lens group guide shaft 52 is supported by the front wall portion 22d. The rear end portion of the third lens group guide shaft 52 passes below the AF mechanism mounting portion 22c and is engaged in a shaft support hole formed in the image-pickup device holder 23. In order to be guided by the third lens group guide shaft 52, the guide arm portion 51b of third lens group frame 51 is formed so that a portion of the guide arm portion 51*b* in the vicinity of the radially outer end thereof projects outwardly from the cylindrical portion 22*a* of the housing 22, and the cylindrical portion 22*a* is provided with an opening 22*e* (see FIG. 7) which allows the guide arm portion 51*b* from projecting outwardly from the cylindrical portion 22*a*. The third lens group frame 51 is provided at the radially outer end of the other guide arm portion 51*c* with an anti-rotation projection 51*e*, and the housing 22 is provided on an inner peripheral surface thereof with a linear guide groove 22*f* elongated in the optical axis direction in which the anti-rotation projection 51*e* is engaged to be freely slidable. The axis of the third lens group guide shaft 52 and the lengthwise direction of the linear guide groove 22*f* are parallel to the optical axis O, and the third lens group frame 51 is guided linearly in a direction parallel to the optical axis O to be movable in the same direction with the guide hole 51*d* and the anti-rotation projection 51*e* being guided by the third lens group guide shaft 52 and the linear guide groove 22*f*, respectively. In addition, the third lens group frame 51 can be moved forward and rearward along the optical axis O by the AF motor 30. The drive mechanism for the third lens group frame 51 will be discussed later.

Figure 7:
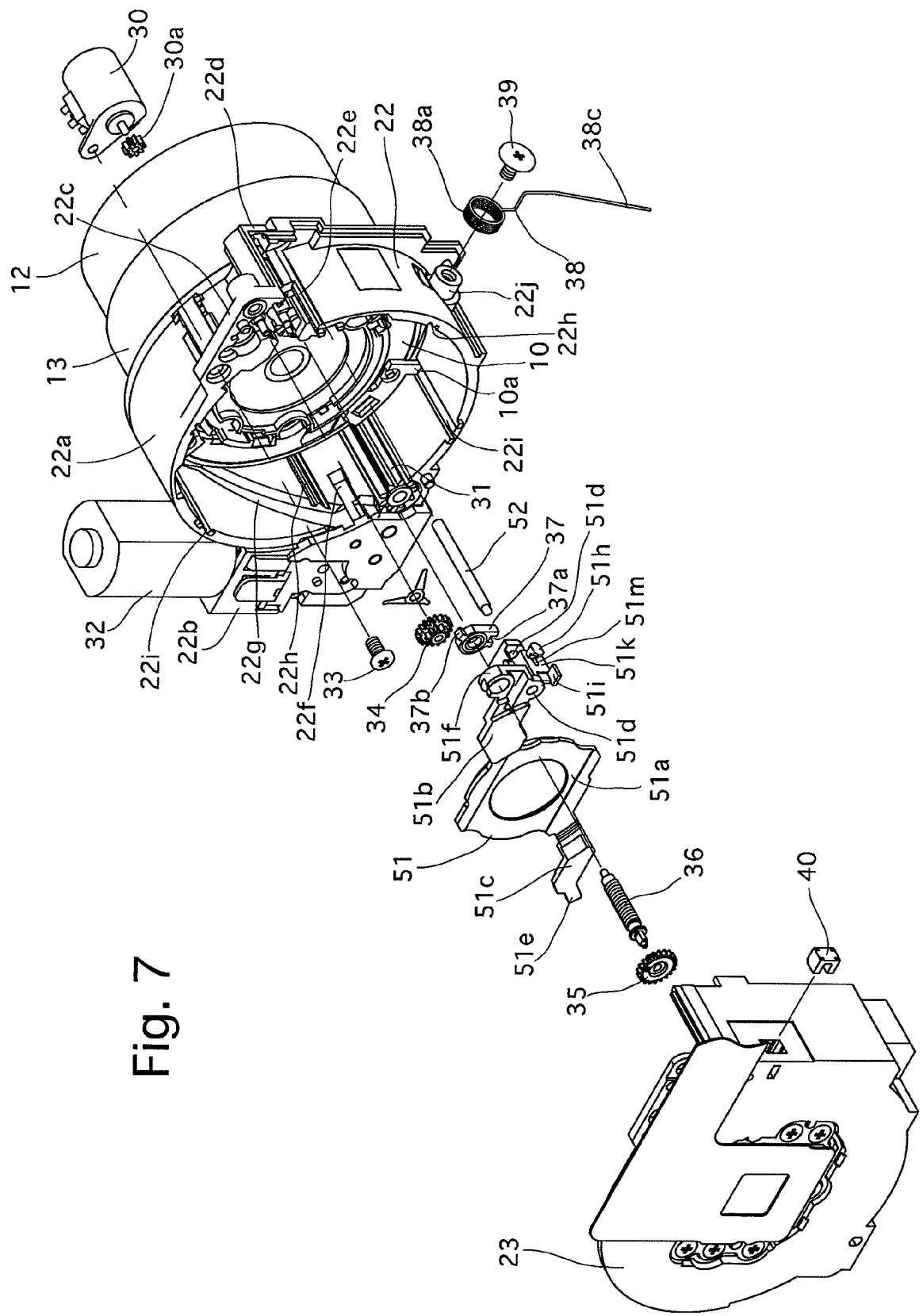
FIG. 7 is an exploded rear perspective view of the zoom lens barrel with elements thereof which are associated with position control for the third lens group removed.

The zoom lens barrel 1 is provided inside the zoom motor support portion 22*b* of the housing 22 with a reduction gear train which transfers the driving force of the zoom motor 32 to a zoom gear 31 (see FIGS. 6 and 7). The cam ring 11 that is supported inside the cylindrical portion 22*a* of the housing 22 is provided at the rear end thereof with an annular gear 11*a* which is in mesh with the zoom gear 31. The cam ring 11 is driven to rotate by the zoom motor 32 via the engagement of the annular gear 11*a* with the zoom gear 31. The cam ring 11 is provided on the annular gear 11*a* with guide projections 11*b*, and the housing 22 is provided on an inner peripheral surface of the cylindrical portion 22*a* with cam ring control grooves 22*g* in which guide projections 11*b* are slidably engaged, respectively. Each cam ring control groove 22*g* is composed of a lead groove portion and a circumferential groove portion, wherein the lead groove portion is inclined with respect to the direction of the optical axis O and the circumferential groove portion is made solely of a circumferential component about the optical axis O. When the zoom lens barrel 1 is in between the accommodated (fully retracted) state shown in FIG. 1 and the wide-angle extremity state shown by an upper half of FIG. 2, by applying torque onto the cam ring 11 via the zoom motor 32 causes the cam ring 11 to move in the optical axis direction while rotating, with the guide projections 11*b* being respectively guided by the aforementioned lead groove portions of the cam ring control grooves 22*g*. More specifically, the cam ring 11 advances (toward the object side) in the optical axis direction while rotating when the zoom lens barrel 1 moves into the wide-angle extremity state (ready-to-photograph state) from the lens barrel accommodated state. Conversely, when the zoom lens barrel 1 moves into the lens barrel accommodated state from the wide-angle extremity state (ready-to-photograph state), the cam ring 11 retracts in the optical axis direction while rotating. On the other hand, when the zoom lens barrel 1 is in a ready-to-photograph state (in the zoom range) between the wide-angle extremity state and the telephoto extremity state, the guide projections 11*b* of the cam ring 11 are positioned in the aforementioned circumferential groove portions of the cam ring control grooves 22*g* so that the cam ring 11 rotates at a fixed position in the optical axis direction, i.e., without moving in the optical axis direction.

The zoom lens barrel 1 is provided inside the cylindrical portion 22*a* of the housing 22 with a first advancing barrel 13 and a linear guide ring 10 which are supported inside the cylindrical portion 22*a* with the cam ring 11 being positioned between the first advancing barrel 13 and the linear guide ring 10. The first advancing barrel 13 is guided linearly in the optical axis direction by the engagement of linear guide projections 13*a* which project radially outwards from the first advancing barrel 13 with linear guide grooves 22*h* which are formed on an inner peripheral surface of the cylindrical portion 22*a*, respectively, and the linear guide ring 10 is guided linearly in the optical axis direction by the engagements of linear guide projections 10*a* which project radially outwards from the linear guide ring 10 with linear guide grooves 22*i* which are formed on an inner peripheral surface of the cylindrical portion 22*a*, respectively. Each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group moving frame 8 linearly in the optical axis direction by linear guide keys 10*b* (see FIG. 2) of the linear guide ring 10 which are positioned inside the cam ring 11. The zoom lens barrel 1 is provided inside the second lens group moving frame 8 with a second lens holding frame 6 which holds the second lens group LG2. The second lens holding frame 6 is integral with the second lens group moving frame 8. In addition, the first advancing barrel 13 is provided on an inner peripheral surface thereof with linear guide grooves 13*b* extending parallel to the optical axis O, and the second advancing barrel 12 is provided with linear guide projections 12*a* which project radially outwards to be slidably engaged in the linear guide grooves 13*b*, so that the second advancing barrel 12 is also guided linearly in the optical axis direction. The zoom lens barrel 1 is provided inside the second advancing barrel 12 with a first lens group holding frame 4 which holds the first lens group LG1.

The cam ring 11 is provided on an inner peripheral surface thereof with second-lens-group control cam grooves 11*c*, and the second lens group moving frame 8 is provided on an outer peripheral surface thereof with cam followers 8*a*, for moving the second lens group LG2, which are slidably engaged in the second-lens-group control cam grooves 11*c*, respectively. Since the second lens group moving frame 8 is guided linearly in the optical axis direction via the linear guide ring 10, a rotation of the cam ring 11 causes the second lens group moving frame 8 (the second lens group LG2) to move in the optical axis direction in a predetermined moving manner in accordance with the contours of the second-lens-group control cam grooves 11*c*.

The second advancing barrel 12 is provided with cam followers 12*b*, for moving the first lens group LG1, which project radially inwards, and the cam ring 11 is provided on an outer peripheral surface thereof with first-lens-group control cam grooves 11*d* in which the cam followers 12*b* are slidably engaged, respectively. Since the second advancing barrel 12 is guided linearly in the optical axis direction via the first advancing barrel 13, a rotation of the cam ring 11 causes the second advancing barrel 12 (the first lens group LG1) to move in the optical axis direction in a predetermined moving manner in accordance with the contours of the first-lens-group control cam grooves 11*d*.

The second lens group moving frame 8 and the second advancing barrel 12 are biased in opposite directions away from each other by an inter-lens-group biasing spring 27 to improve the degree of precision of the engagement between each cam follower 8*a* and the associated second-lens-control cam groove 11*c* and the degree of precision of the engagement between each cam follower 12*b* and the associated first-lens-group control cam groove 11*d*.

The zoom lens barrel 1 is provided inside the second lens group moving frame 8 with a shutter unit 15 including the set of shutter blades S which are supported by the second lens group moving frame 8. The zoom lens barrel 1 is provided behind the second lens group moving frame 8 with a rear-mounted limit member 5, and the second lens group moving frame 8 and the rear-mounted limit member 5 are provided with a guide projection 8b and a guide projection 5a as a pair of projections which project in directions toward each other along a direction parallel to the optical axis O. The shutter unit 15 is supported by the two guide projections 8b and 5a to be slidable thereon in the optical axis direction.

A decorative plate 16 having a photographing aperture 16a is fixed to the front end of the second advancing barrel 12, and the zoom lens barrel 1 is provided immediately behind the decorative plate 16 with a set of protective barrier blades 17 which opens and shuts the photographing aperture 16a that is positioned in front of the first lens group LG1.

Operations of the zoom lens barrel 1 that has the above described structure will be discussed hereinafter. In the lens barrel accommodated state shown in FIGS. 1, 3 and 4, the length of the optical system in the optical axis direction (the distance from the front surface (object-side surface) of the first lens group LG1 to the imaging surface of the image-pickup device 24) is shorter than that in a ready-to-photograph state shown in FIGS. 2, 5 and 6. In the lens barrel accommodated state, upon a state transitional signal for transition from the lens barrel accommodated state to a ready-to-photograph state (e.g., turning ON a main switch of the camera to which the zoom lens barrel 1 is mounted) is turned ON, the zoom motor 32 is driven in the lens barrel advancing direction. This causes the zoom gear 31 to rotate, thus causing the cam ring 11 to move forward in the optical axis direction while rotating with the guide projections 11b being guided by the lead groove portions of the cam ring control grooves 22g, respectively. The linear guide ring 10 and the first advancing barrel 13 linearly move forward with the cam ring 11. This rotation of the cam ring 11 causes the second lens group moving frame 8 to move in the optical axis direction in a predetermined moving manner due to the engagements between the cam followers 8a and the second-lens-group control cam grooves 11c. In addition, the rotation of the cam ring 11 causes the second advancing barrel 12, which is guided linearly in the optical axis direction via the first advancing barrel 13, to move in the optical axis direction in a predetermined moving manner due to the engagements between the cam followers 12b and the first-lens-group control cam grooves 11d.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 on the optical axis O while changing the air distance between the first lens group LG1 and the second lens group LG2. Driving the zoom motor 32 in a barrel-advancing direction so as to advance the zoom lens barrel from the lens barrel accommodated state shown in FIG. 1 firstly causes the zoom lens barrel 1 to move to the wide-angle extremity shown in the upper half of the cross sectional view in FIG. 2, and further driving the zoom motor 32 in the same direction causes the zoom lens barrel 1 to move to the telephoto extremity shown in the lower half of the cross sectional view in FIG. 2. In the zooming range between the telephoto extremity and the wide-angle extremity, the cam ring 11 only performs the above described fixed-position rotating operation while the guide projections 11b are engaged in the cam ring control grooves 22g of the housing 22, respectively, thus not moving either forward or rearward in the optical axis direction. Upon the main switch being turned OFF, the zoom motor 32 is driven in the lens barrel retracting direction, which causes the zoom lens barrel 1 to perform a lens barrel retracting operation reverse to the above described lens barrel advancing operation, thus returning the zoom lens barrel 1 back to the lens barrel accommodated state shown in FIG. 1.

The set of shutter blades S are positioned behind the second lens group LG2 when the zoom lens barrel 1 is in a ready-to-photograph state as shown in FIG. 2. When the zoom lens barrel 1 moves from a ready-to-photograph state to the lens barrel accommodated state that is shown in FIG. 1, the shutter unit 15 is moved forward relative to the second lens group moving frame 8, inside the second lens group moving frame 8, in the optical axis direction so that a part of the second lens group LG2 and the set of shutter blades S lie in a plane orthogonal to the optical axis O. In addition, the set of protective barrier blades 17 are closed when the zoom lens barrel 1 is in the lens barrel accommodated state. The set of protective barrier blades 17 are opened in accordance with the advancing operation of the zoom lens barrel 1, in which the zoom lens barrel 1 is extended into a ready-to-photograph state.

The third lens group frame 51 that supports the third lens group LG3 can be moved forward and rearward in the optical axis direction by the AF motor 30 independently of the above described driving operations of the first lens group LG1 and the second lens group LG2 that are performed by the zoom motor 32. In addition, when the zoom lens barrel 1 is in a ready-to-photograph state at any focal length from the wide-angle extremity to the telephoto extremity, the third lens group frame 51 that supports the third lens group LG3 is moved along the optical axis direction to perform a focusing operation by driving the AF motor 30 in accordance with object distance information obtained by a distance measuring device (not shown) provided in, e.g., the camera to which the zoom lens barrel 1 is mounted.

The details of the position control mechanism for controlling the position of the third lens group frame 51 will be discussed hereinafter. As described above, the AF mechanism mounting portion 22c is formed on the housing 22 so as to be positioned outside the cylindrical portion 22a, and the front wall portion 22d is formed on the housing so as to be positioned in front of the AF mechanism mounting portion 22c to face thereto. The AF motor 30 is fixed to the front of the AF mechanism mounting portion 22c by a set screw 33 so that a pinion 30a fixed on the rotary shaft of the AF motor 30 projects rearward from the back surface of the AF mechanism mounting portion 22c (see FIG. 6). An intermediate gear 34 which is engaged with the pinion 30a and a driven gear 35 which is engaged with the intermediate gear 34 are rotatably supported on a back surface of the AF mechanism mounting portion 22c. The driven gear 35 is fixed to the rear end of a lead screw (screw shaft) 36. Rotation of the rotary shaft of the AF motor 30 is transferred to the lead screw 36, via the pinion 30a, the intermediate gear 34 and the driven gear 35 which constitute a reduction gear train of AF drive mechanism. The front and rear ends of the lead screw 36 are fitted in a front shaft hole and a rear shaft hole which are formed in the front wall portion 22d of the housing 22 and the image-pickup device holder 23 to be rotatably supported thereby, respectively, so that the lead screw 36 can freely rotate on an axis of rotation substantially parallel to the optical axis O.

The third lens group frame 51 is provided at the radially outer end of the guide arm portion 51b with a nut abutting portion 51f. A through hole into which the lead screw 36 is inserted is formed through the nut abutting portion 51f. An AF nut 37 which is screw-engaged with the lead screw 36 is installed in front of the nut abutting portion 51f. The AF nut 37 is prevented from rotating by the engagement of an anti-rotation recess 37a (see FIG. 7) of the AF nut 37 with an anti-rotation projection 51g (see FIG. 8) of the third lens group frame 51 and the engagement of an anti-rotation projection 37b of the AF nut 37 with an anti-rotation recess (not shown) formed in the housing 22. Rotating the lead screw 36 forward and reverse causes the AF nut 37 to move forward and rearward in a direction parallel to the optical axis O without rotating with the lead screw 36. The third lens group frame 51 is provided, in the vicinity of the radially outer end of the guide arm portion 51b between the pair of guide holes 51d, with an upright wall portion (contacting portion) 51k which is formed in a flat shape substantially parallel to the optical axis O. The third lens group frame 51 is provided on the upright wall portion 51k with a spring hook 51h which projects laterally from the upright wall portion 51k. The spring hook 51h is formed in an L-shaped projection which is bent so that the front end faces rearwardly in the optical axis direction. The third lens group frame 51 is provided, behind the spring hook 51h on a side of the upright wall portion 51k, with a semicircular-cross-sectional portion 51m.

The zoom lens barrel 1 is provided therein with a torsion spring 38 serving as a biasing device which gives the third lens group frame 51 a biasing force in a direction to move the third lens group frame 51 along the optical axis O. The torsion spring 38 has a coiled portion 38a. The coiled portion 38a is supported by a spring support projection 22j formed on the housing 22. The spring support projection 22j is shaped into a cylindrical projection and formed on an outer surface of the cylindrical portion 22a with the axis of the spring support projection 22j extending in a direction substantially orthogonal to a vertical plane P1 (see FIG. 10) parallel to the optical axis O (the vertical plane P1 includes the optical axis O). The coiled portion 38a of the torsion spring 38 is held onto the cylindrical outer surface of the spring support projection 22j while being prevented from slipping off the spring support projection 22j by screwing a set screw 39 in a screw hole formed through the center of the spring support projection 22j. The central axis of the coiled portion 38a held to the spring support projection 22j is substantially coincident with the central axis of the spring support projection 22j.

The torsion spring 38 is provided with a short support arm portion (second arm portion) 38b and a long biasing arm portion (arm/first arm portion) 38c, each of which projects radially outward from the coiled portion 38a. The short support arm portion 38b is hooked onto a spring hook (projection) 22k (see FIG. 12) which is formed on the housing 22 in the vicinity of the spring support projection 22j. On the other hand, the free end of the biasing arm portion 38c is hooked onto the spring hook 51h of the third lens group frame 51. The upright wall portion 51k and the semicircular-cross-sectional portion 51m of the third lens group frame 51 also have a function to prevent the biasing arm portion 38c from coming in contact with any nearby parts other than the spring hook 51h upon the biasing arm portion 38c being brought into engagement with the spring hook 51h. The biasing arm portion 38c serves as a swingable force-applied portion capable of swinging about a swing axis 38x (fulcrum) substantially coincident with the axis of the coiled portion 38a (i.e., capable of swinging in a swing plane substantially parallel to the vertical plane P1). In other words, the biasing arm portion 38c is swingable about the swing axis 38x which is substantially orthogonal to the optical axis O.

Figure 12:
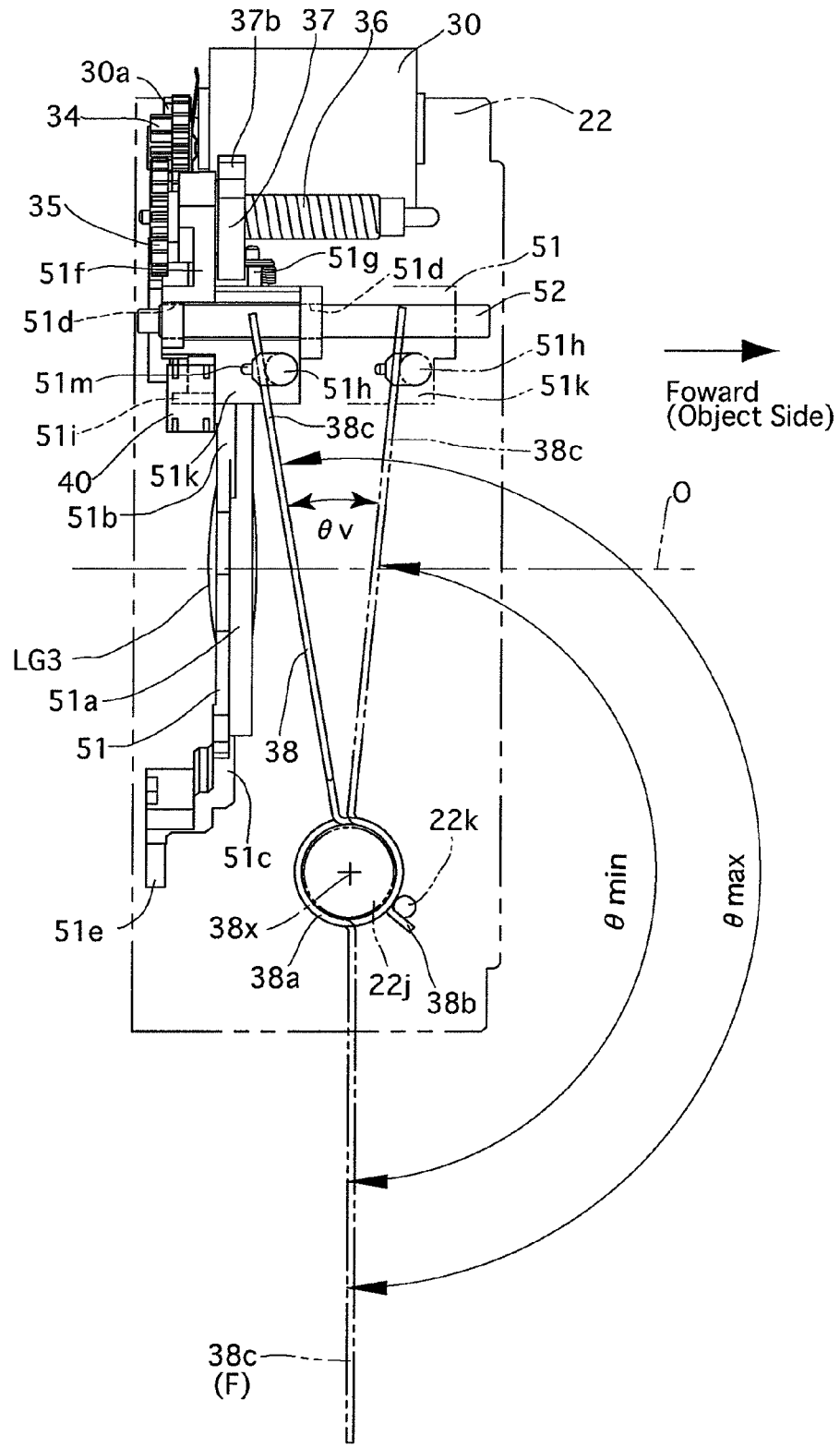
FIG. 12 is a side elevational view of the third lens group frame and the position control mechanism therefor, showing the operation of the torsion spring of the position control mechanism that biases the third lens group frame.

When in a free state where the biasing arm portion 38c is not hooked on the spring hook 51h, the biasing arm portion 38c extends vertically downward from the coiled portion 38a with respect to FIG. 12 as shown by a two-dot chain line designated by a reference numeral 38c (F) in FIG. 12. From this state, rotating the biasing arm portion 38c by a substantially half rotation counterclockwise with respect to 38c (F) of FIG. 12 and hooking a portion of the biasing arm portion 38c at the free end thereof onto the rear surface of the spring hook 51h in the optical axis direction, the amount of resilient deformation (twist) of the torsion spring 38 increases, and the resilience of the torsion spring 38 acts as a load on the spring hook 51h which makes the biasing arm portion 38c press against the spring hook 51h in a direction toward the front of the optical axis direction. Namely, the torsion spring 38 comes into a force-applied state in which a biasing force of the torsion spring 38 toward the front in the optical axis direction is applied to the third lens group frame 51 via the biasing arm portion 38c.

Figure 8:
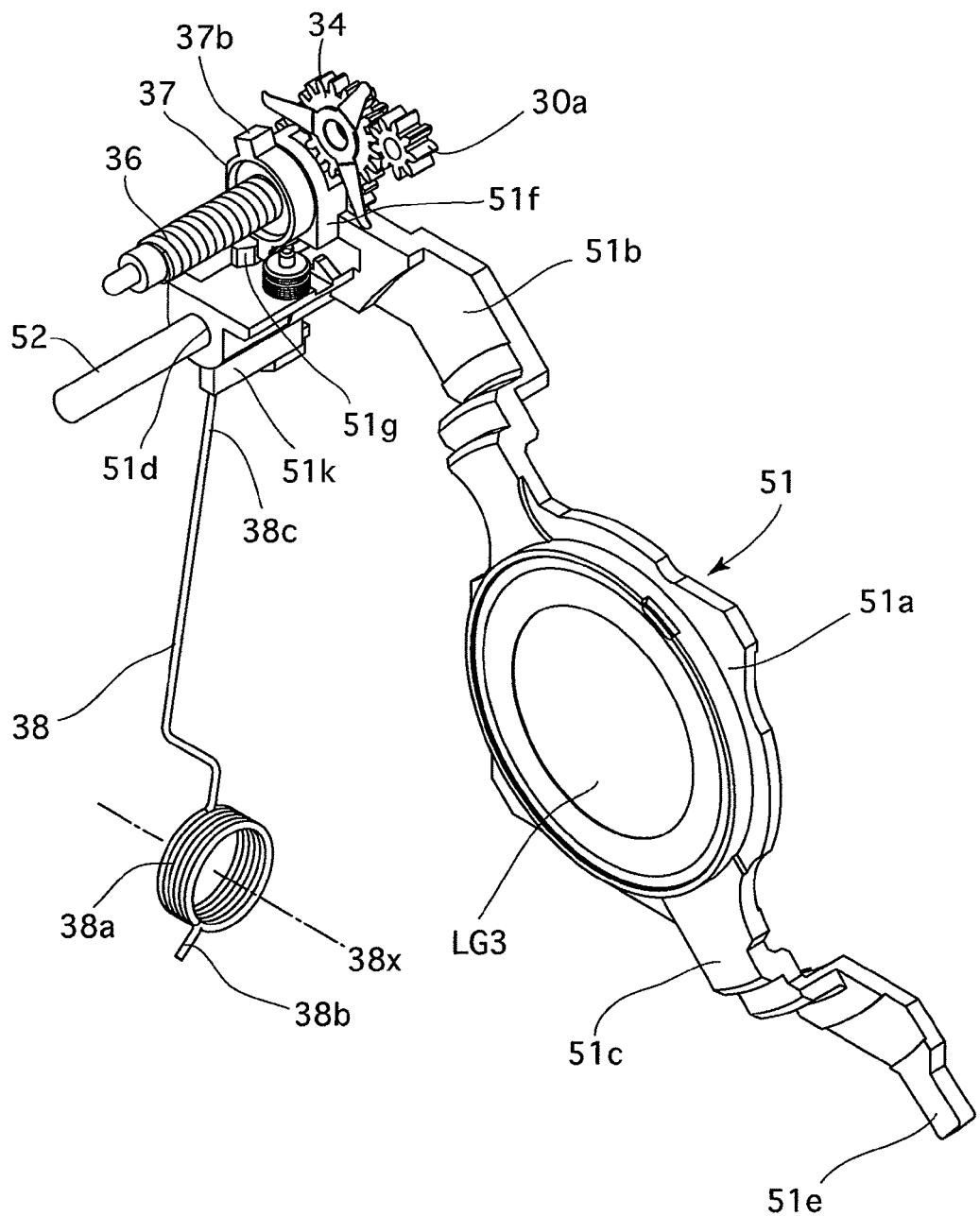
FIG. 8 is a front perspective view of the third lens group frame and main parts of the position control mechanism therefor.
Figure 9:
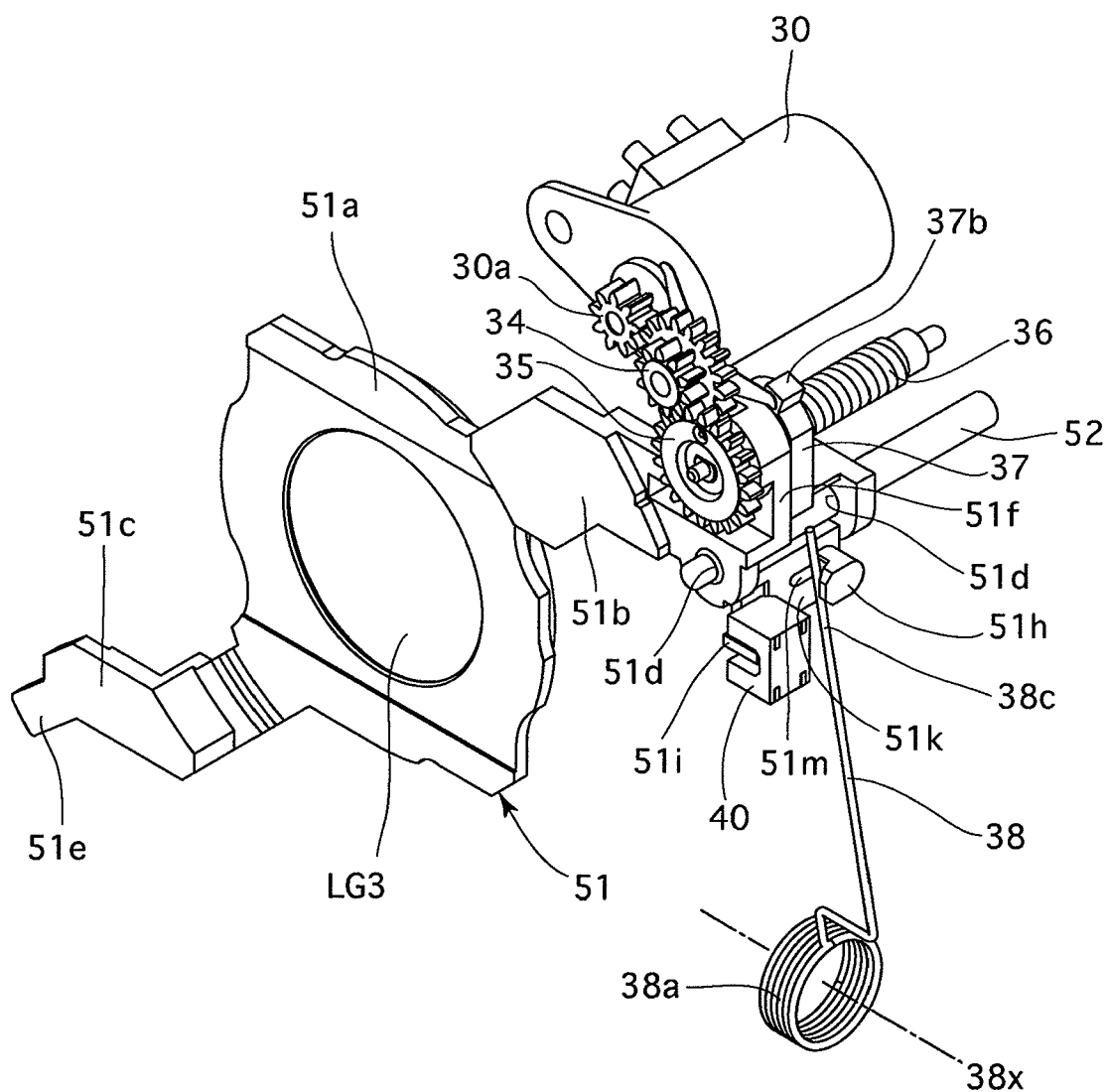
FIG. 9 is a rear perspective view of the third lens group frame and main parts of the position control mechanism therefor.

In this manner, the third lens group frame 51, to which a biasing force toward the front in the optical axis direction is applied by the torsion spring 38, is prevented from moving forward by the abutment of the nut abutting portion 51f against the AF nut 37. Namely, as shown in FIGS. 8, 9 and 12, the third lens group frame 51 is held with the nut abutting portion 51f being in contact with the AF nut 37 by the biasing force of the torsion spring 38, and the position of the third lens group frame 51 in the optical axis direction is determined according to the AF nut 37. Since the AF nut 37 is moved forward and rearward in a direction parallel to the optical axis O via the lead screw 36 by rotating the pinion 30a of the AF motor 30 forward and reverse, the position of the third lens group frame 51 in the optical axis direction is controlled in accordance with the driving direction and the driving amount of the AF motor 30. For instance, if the AF nut 37 is moved forward by the AF motor 30, the third lens group frame 51 follows the forward movement of the AF nut 37 via the biasing force of the torsion spring 38 to move forward by the amount of the forward movement of the AF nut 37. Conversely, if the AF nut 37 is moved rearward from the forward moved position thereof, the AF nut 37 presses the nut abutting portion 51f rearward, so that the third lens group frame 51 is moved rearward against the biasing force of the torsion spring 38.

An origin position sensor 40 for detecting the limit of rearward movement of the third lens group frame 51 in the optical axis direction that is moved by the AF motor 30 is installed in the housing 22. The origin position sensor 40 is constructed from a photo-interrupter which includes a body having a U-shaped cross section with a light emitter and a light receiver which are provided thereon so as to face each other with a predetermined distance therebetween, and it is detected that the third lens group frame 51 is positioned at the limit of rearward movement thereof when a sensor interrupt plate 51i formed integral with the third lens group frame 51 passes between the light emitter and the light receiver. The AF motor 30 is a stepping motor. The amount of movement of the third lens group LG3 when a focusing operation is performed is calculated as the number of steps for driving the AF motor 30 with the limit of rearward movement being taken as the point of origin.

The limit of rearward movement of the third lens group frame 51 in the range of movement thereof that is controlled by the AF motor 30 is shown by a solid line in FIG. 12, and the limit of forward movement of the third lens group frame 51 in the same range of movement thereof is shown by a two-dot chain line in FIG. 12. FIG. 14A shows variations in load of the torsion spring 38 in accordance with positional variations of the third lens group frame 51 in the optical axis direction. The degree of the swing angle of the biasing arm portion 38c of the torsion spring 38 from the position in a free state thereof when the third lens group frame 51 is at the limit of rearward movement is represented by θmax, and the degree of the swing angle of the biasing arm portion 38c of the torsion spring 38 from the position in a free state thereof when the third lens group frame 51 is at the limit of forward movement is represented by θmin (see FIG. 12). In addition, the loads of the torsion spring 38 which correspond to the swing angles θmin and θmax are represented by Fmin and Fmax, respectively. As can be seen from FIG. 12, the amount of angular displacement θv between the minimum swing angle θmin and the maximum swing angle θmax when the torsion spring 38 is in the aforementioned force-applied state is far smaller than the minimum swing angle θmin that ranges from a free state of the torsion spring 38 until when the torsion spring 38 comes into the force-applied state. Therefore, the variation from the minimum load Fmin to the maximum load Fmax in the range of movement of the third lens group frame 51 can be reduced to a minimum.

Figure 13:
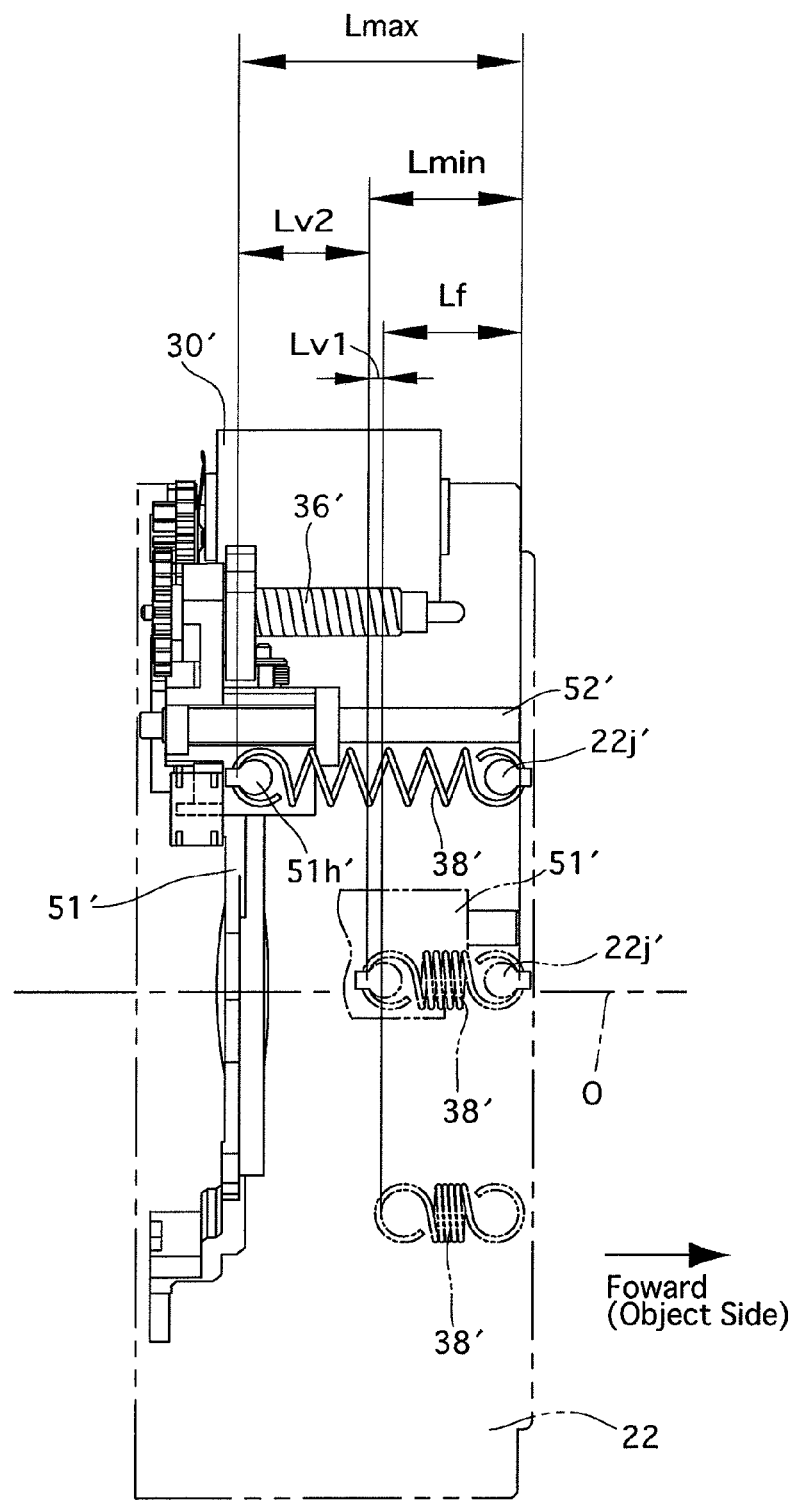
FIG. 13 is a side elevational view of the third lens group frame and the position control mechanism therefor in a comparative example that uses an extension spring as the biasing device for biasing the third lens group frame.

FIG. 13 shows a comparative example in which the torsion spring 38 is replaced by an extension spring 38' which expands and contracts in a direction parallel to the optical axis O. One end of the extension spring 38' is hooked onto a spring hook 51h' of a third lens group frame 51' (which corresponds to the third lens group frame 51) and the other end of the extension spring 38' is hooked onto a spring hook 22j' of a housing 22' (which corresponds to the housing 22). The third lens group frame 51' is movable forward and rearward in the optical axis direction along a third lens group guide shaft 52' (which corresponds to the third lens group guide shaft 52), and the limit of rearward movement and the limit of the forward movement of the third lens group frame 51' in the range of movement thereof that is controlled by an AF motor 30' (which corresponds to the AF motor 30) are represented by a solid line and a two-dot chain line, respectively. In addition, in FIG. 13, the length of the extension spring 38' with the position of engagement with the spring hook 22j' of the housing 22' as a reference position when the third lens group frame 51 is at the limit of forward movement thereof is represented by Lmin, and the length of the extension spring 38' with the position of engagement with the spring hook 22j' of the housing 22' as a reference position when the third lens group frame 51 is at the limit of rearward movement thereof is represented by Lmax. Since the spring hook 22j', the position of which is fixed, is positioned at the front of the optical element position control mechanism, the extension spring 38' becomes longest (Lmax) when the third lens group frame 51' is positioned at the limit of rearward movement thereof. Lf shown in FIG. 13 designates the length of the extension spring 38' when it is in a free state.

Figure 14B:
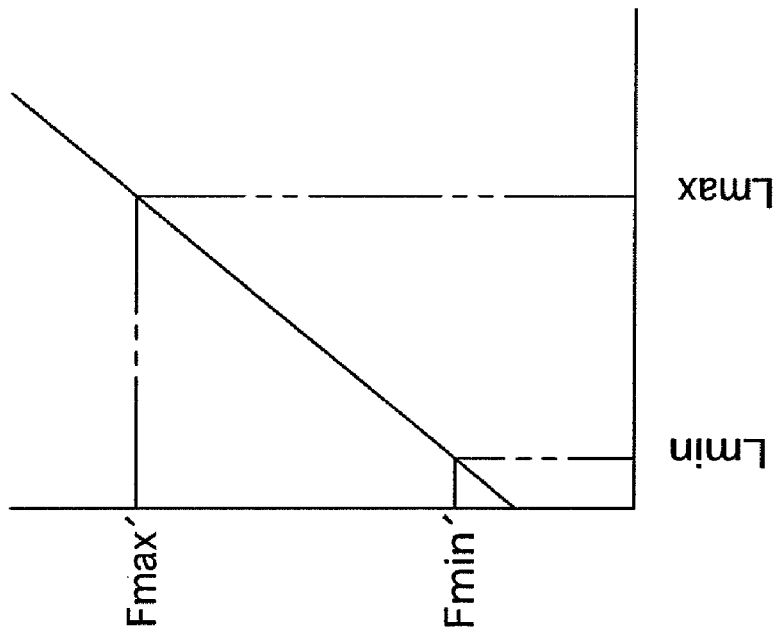
Figure 14A:
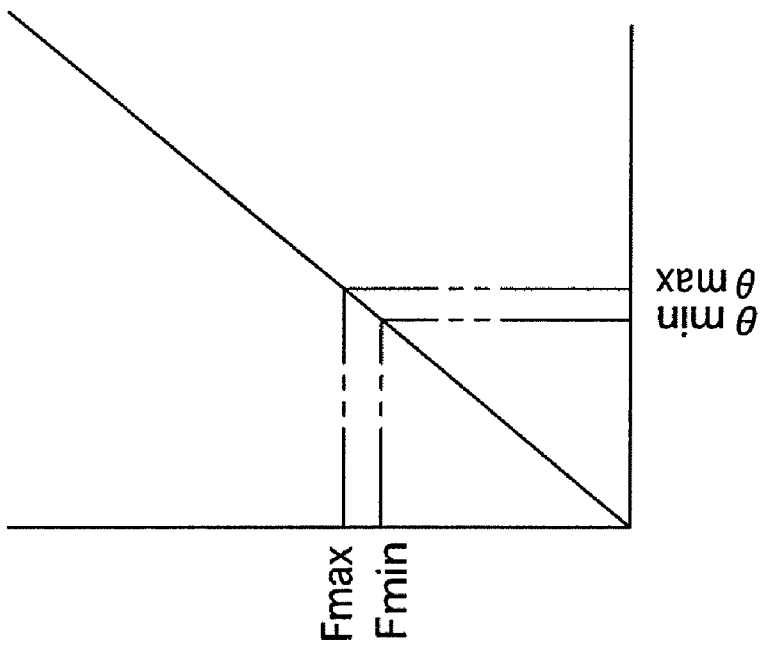

FIG. 14B shows variations in load of the extension spring 38' in the comparative example shown in FIG. 13. Fmin' in FIG. 14B represents the spring load when the length of the extension spring 38' is Lmin, and Fmax' in FIG. 14B represents the spring load when the length of the extension spring 38' is Lmax. As can be understood from FIG. 13, the displacement Lv2 between the minimum length Lmin and the maximum length Lmax (in a force-applied state where a biasing force of the extension spring 38' toward the front in the optical axis direction is applied to the third lens group frame 51') is far greater than the displacement Lv1 from the length Lf (the length when the extension spring 38' is in a free state) until when the extension spring 38' comes into the force-applied state. Since the magnitude of the load of the extension spring 38' varies in proportion to the variation in length of the extension spring 38', the difference between the load Fmin' when the length of the extension spring 38' is the minimum length Lmin and the load Fmax' when the length of the extension spring 38' is the maximum length Lmax becomes extremely large in the extension spring 38'. In addition, the AF motor 30' needs to be a high-power motor in order to cope with the maximum load Fmax'.

To reduce the load variation, namely, to reduce the difference in length of the extension spring 38' between the maximum length Lmax and the minimum length Lmin, it is conceivable that an extension spring having a longer length in a free state will be adopted as the extension spring 38'. However, if such a long extension spring is adopted as the extension spring 38', a corresponding larger space will be necessary, which runs counter to the demand for miniaturization of the zoom lens barrel. The comparative example shown in FIG. 13 is substantially identical in structure of the embodiment shown in FIG. 12 except for the extension spring 38'. If an extension spring having a longer length is adopted as the extension spring 38', the spring hook 22j' has to be provided in front (on the right-hand side with respect to FIG. 13) of the position of the front end of the zoom lens barrel (which substantially corresponds to the position of the front end of the housing 22') in the accommodated state. Namely, adopting an extension spring having a longer length as the extension spring 38' causes an increase in length of the zoom lens barrel in the accommodated state. In this respect, a maximum length which is structurally possible in the zoom lens barrel has been given to the extension spring 38' in the comparative example shown in FIG. 13, and accordingly, it is difficult to reduce the load variation to a small degree more than the degree shown in FIG. 14B while maintaining the current size of the zoom lens barrel in the accommodated state, so that it is impossible to satisfy both the demand for miniaturization of the zoom lens barrel and the demand for a reduction of the load variation simultaneously.

If the range of movement of the third lens group frame 51' is reduced (if the limit of rearward movement of the third lens group frame 51' is set in front of that shown by a solid line in FIG. 13), it is possible to reduce the maximum load of the extension spring 38' with no need to lengthen the length of the extension spring 38' in a free state; however, such a reduction of the range of movement of the third lens group frame 51' inevitably limits the range of movement of the third lens group LG3, so that a required optical performance may not be obtained. Accordingly, it is not practical to reduce the range of movement of the third lens group frame 51'.

Although the extension spring 38' is used in the comparative example shown in FIG. 13, the same problem arises even if the extension spring 38' is replaced by a compression spring. Namely, regardless of as to whether the spring member for biasing the third lens group frame 51' is an extension spring or a compression spring, it is difficult to achieve a balance between miniaturization of the zoom lens barrel and a reduction of the load variation of the spring member in the particular biasing structure in which the spring member which expands and contracts in the direction of forward/rearward movement of the third lens group frame 51' is directly connected between the third lens group frame 51' and a stationary member (the housing 22').

In contrast, in the above described embodiment of the optical element position control mechanism that uses the torsion spring 38 as a biasing device for biasing the third lens group frame 51, the load variation of the torsion spring 38 is far smaller than that in the comparative example and also the maximum load of the spring is smaller than that in the comparative example even though the torsion spring 38 is a biasing device installed in an installation space which is equal in size to that in the comparative example, as can be understood by the comparison between the graphs in FIGS. 14A and 14B. As a result, the energy required for driving the third lens group frame 51 is averaged at a low level, which makes it possible to reduce the power consumption of the AF motor 30. In other words, a power-saving type of AF motor can be adopted as the AF motor 30. In addition, since the load variation in accordance with movement of the third lens group frame 51 is small, the third lens group frame 51 can be driven smoothly over the entire range of movement thereof; moreover, noise does not easily occur from the drive mechanism for transmitting a driving force from the AF motor 30 to the third lens group frame 51.

As described above, in the torsion spring 38, the amount of angular displacement ($\theta v$) of the biasing arm portion 38c in the force-applied state between the limit of forward movement and the limit of rearward movement of the third lens group frame 51 is smaller than the minimum swing angle ($\theta \min$) of the biasing arm portion 38c, which ranges from a free state thereof until when the torsion spring 38 comes into the force-applied state, and a conditional expression "$\theta v/\theta \min <1$" is satisfied, which minimizes the load variation in the force-applied state. Although the degree of the minimum swing angle $\theta \min$ is set to substantially a half rotation in the embodiment shown in FIG. 12, the amount of angular displacement ($\theta v$) of the biasing arm portion 38c in the working section in the force-applied state can be made relatively small by increasing the value of the minimum swing angle $\theta \min$ that serves as a denominator of the aforementioned conditional expression (the amount of angular displacement $\theta v$ is constant since the maximum swing angle $\theta \max$ increases as the minimum swing angle $\theta \min$ increases), which makes it possible to achieve a further reduction of the difference between the maximum load and the minimum load of the torsion spring 38. Although the load variation is effectively suppressed by satisfying the conditional expression "$\theta v/\theta \min <1$", a better effect is obtained if a conditional expression "$\theta v/\theta \min <0.5$" is satisfied. As a practical technique to increase the value of the minimum swing angle $\theta \min$, the biasing arm portion 38c can be hooked on the spring hook 51h after being twisted through 360-degree or more about the coiled portion 38a (about the swing axis 38x) from a free state of the biasing arm portion 38c. Since the torsion spring 38 does not substantially change the size thereof even if the amount of resilient deformation of the torsion spring 38 in a rotation direction about the axis of the coiled portion 38a (the swing axis 38x) is increased, the space for the installation of the torsion spring 38 does not have to be increased, unlike the above described case in the comparative example where an extension spring or a compression spring which has a longer length in a free state is adopted. If conditions such as the thickness of the steel wire of the spring are the same, the load of the torsion spring 38 averagely increases if the amount of resilient deformation of the torsion spring 38 which ranges from a free state thereof until when the torsion spring 38 comes into the force-applied state is increased, so that the amount of resilient deformation of the torsion spring 38 is set within a range in which the maximum load thereof does not become excessively great.

Also, one of the factors which have minimized the load variation of the torsion spring 38 is the length of the biasing arm portion 38c from the coiled portion 38a, about which the biasing arm portion 38c swings, to the force application point (working point) on the third lens group frame 51. The greater the length of the biasing arm portion 38 from the swing axis 38x to the force application point, i.e., the greater the radius of rotation of the swing operation of the torsion spring 38 in the vicinity of the free end thereof, the smaller the displacement angle ($\theta v$) of the biasing arm portion 38c per unit of displacement of the third lens group frame 51, thereby making it possible to curb variations in the spring load. Assuming a horizontal plane P2 which is substantially parallel to the swing axis 38x of the torsion spring 38 and includes the optical axis O, the spring hook 51h at which the biasing arm portion 38c is hooked onto the third lens group frame 51 is positioned in the area above the horizontal plane P2 as shown in FIG. 10. On the other hand, the spring support projection 22j of the housing 22, which supports the coiled portion 38a that serves as the swing axis of the torsion spring 38, is positioned in the area below the horizontal plane P2. Therefore, the biasing arm portion 38c of the torsion spring 38 is elongated in the vertical direction across the horizontal plane P2. Since the torsion spring 38 is installed radially outside the cam ring 11 that is a rotatable member in the zoom lens barrel 1, it is possible for such a long length be given to the biasing arm portion 38c without the biasing arm portion 38c interfering with any movable members associated with the first lens group LG1 or the second lens group LG2 that is driven by the cam ring 11.

In addition, also in regard to the shape of the front projection view of the zoom lens barrel 1, the position control mechanism for controlling the position of the third lens group frame 51 that includes the torsion spring 38 has been installed in the zoom lens barrel 1 in a space saving manner. As shown in FIG. 10, elements of the zoom lens barrel 1 such as the third lens group guide shaft 52 (which is an element of a guide mechanism for the third lens group frame 51), the AF nut 37, the AF motor 30 and the lead screw 36 (which are elements of the drive mechanism for the third lens group frame 51) are installed in a substantially triangular space formed above the horizontal plane P2 along an outer peripheral surface of the cylindrical portion 22a of the housing 22. The coiled portion 38a of the torsion spring 38 is supported in another substantially triangular space formed below the horizontal plane P2, wherein the two substantially triangular spaces that are respectively formed above and below the horizontal plane P2 are substantially symmetrically positioned with respect to the horizontal plane P2. Although the shapes of front projectional views of optical devices such as a camera to which the zoom lens barrel 1 is mounted are often based on a rectangular shape (e.g., having a rectangular housing), such a configuration makes it possible to accommodate the position control mechanism for controlling the position of the third lens group frame 51 effectively in a dead space created between a rectangular housing portion of the camera and an outer peripheral surface of the cylinder-shaped housing portion 22a. In addition, as can be seen from FIG. 10, the biasing arm portion 38c of the torsion spring 38 is elongated in close vicinity of the cylindrical portion 22a, extending toward the upper triangular space from the lower triangular space in a manner such that the biasing arm portion 38c of the torsion spring 38 is substantially tangent to an outer peripheral surface of the cylindrical portion 22a. Therefore, the installation of the torsion spring 38 outside the cylindrical portion 22a has little effect on the lateral width of the zoom lens barrel 1.

As described above, the mechanism for biasing the third lens group frame 51 by the torsion spring 38 in the above described embodiment of the optical element position control mechanism can reduce load on the AF motor 30 to thereby achieve a reduction in power consumption of the AF motor 30 while contributing to miniaturization of the zoom lens barrel 1, especially to a reduction of the length of the zoom lens barrel 1 in the accommodated state.

Figure 15:
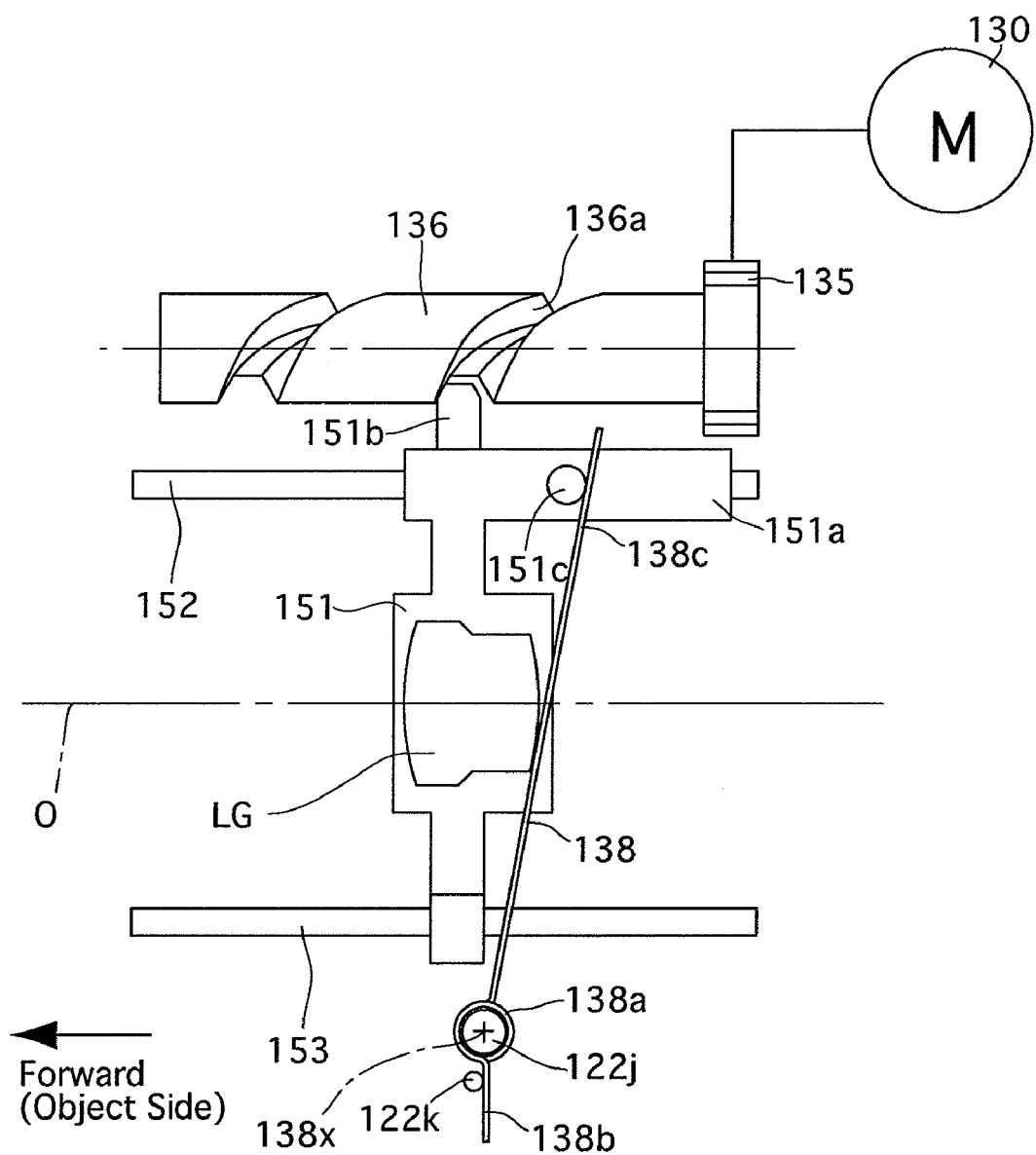
FIG. 15 is a side elevational view of a second embodiment of the optical element position control mechanism, which is configured to control the position of a lens frame, wherein a lead cam shaft is used instead of the lead screw mechanism used in the first embodiment of the optical element position control mechanism that is shown in FIG. 1 through 12.

A second embodiment of the optical element position control mechanism according to the present invention will be hereinafter discussed with reference to FIGS. 15 and 16. Movements of the third lens group frame 51 are controlled by the lead screw 36 and the AF nut 37 in the first embodiment of the optical element position control mechanism. However, in the second embodiment of the optical element position control mechanism, instead of a lead screw, a lead cam shaft 136 is used as an element of a drive mechanism for driving a lens frame (optical element holding member) 151 which holds a lens group LG. The lens frame 151 is guided linearly in a direction parallel to the optical axis O by a guide shaft (advancing/retracting movement guide member) 152 and an anti-rotation shaft 153 which extend parallel to the optical axis O. The guide shaft 152 is slidably inserted into a guide hole formed through a cylindrical portion 151a of the lens frame 151, and the anti-rotation shaft 153 is slidably engaged in an anti-rotation groove 151d formed on a portion of the lens frame 151 on the opposite side of the lens frame 151 from the cylindrical portion 151a, wherein the anti-rotation groove 151d and the cylindrical portion 151a are substantially symmetrically positioned with respect to the optical axis O. A guide pin 151b projects from the cylindrical portion 151a that is guided by the guide shaft 152. The guide pin 151b is engaged in a lead groove 136a formed on a peripheral surface of the lead cam shaft 136. The lead groove 136a includes a pair of axially opposed guide surfaces which are inclined with respect to the direction of the optical axis O, and a predetermined clearance is created between the guide pin 151b and the pair of axially opposed guide surfaces to allow the guide pin 151b to slide thereon. The lead cam shaft 136 is provided at one end thereof with a gear 135. By applying a torque to the lead cam shaft 136 via the gear 135 by a motor 130 causes the lead cam shaft 136 to rotate about an axis of rotation parallel to the optical axis O. Thereupon, the guide pin 151b is guided while sliding on the pair of axially opposed guide surfaces of the lead groove 136a, which causes the lens frame 151 to move in the optical axis direction.

A torsion spring (biasing device) 138 is supported by an outer peripheral surface of a cylinder-shaped spring support projection 122j with a coiled portion 138a of the torsion spring 138 being fitted on the spring support projection 122j and with the axis of the coiled portion 138a extending in a direction orthogonal to the optical axis O. The position of the spring support projection 122j is fixed. The torsion spring 138 includes a support arm portion (second arm portion) 138b and a biasing arm portion (arm/first arm portion) 138c both of which project radially outwards from the coiled portion 138a, and the support arm portion 138b is engaged with a fixed projection 122k while the free end of the biasing arm portion 138c is engaged with a spring hook (projection) 151c of the lens frame 151. In this spring-engaged state, the biasing arm portion 138c of the torsion spring 138 can swing about a swing axis 138x which is substantially orthogonal to the optical axis o and substantially coincident with the axis of the coiled portion 138a that is supported by the spring support projection 122j, and biases the lens frame 151 forward in the optical axis direction (leftward direction with respect to FIG. 15). This biasing force causes the guide pin 151b to be pressed against one of the pair of axially opposed guide surfaces of the lead groove 136a which is closer to the front in the optical axis direction to eliminate backlash between the guide pin 151b and the lead groove 136a. Since the spring hook 151c is formed at substantially a center of the cylindrical portion 151a in the lengthwise direction thereof, a tilting moment acting on the cylindrical portion 151a to tilt the cylindrical portion 151a relative to the guide shaft 152 does not easily occur upon the spring hook 151c receiving the load of the torsion spring 138, which ensures smooth movement of the lens frame 151 in the optical axis direction.

According to the torsion spring 138, in a similar manner to the torsion spring 38 of the first embodiment, variations of the spring load in the force-applied state can be reduced and loads on the motor 130 can be reduced when the lens frame 151 is moved forward and rearward in the optical axis direction via the motor 130 and the lead cam shaft 136. In addition, similar to the position control mechanism for controlling the position of the third lens group frame 51 that includes the torsion spring 38, the space for the installation of the torsion spring 138 does not increase even if the amount of rotation of the biasing arm portion 138c is changed when the torsion spring 138 is brought to come into the force-applied state from a free state, hence, the position control mechanism for controlling the position of the lens frame 151 that includes the torsion spring 138 is installed in a space saving manner. Additionally, as can be understood from the second embodiment shown in FIGS. 15 and 16, the application of the biasing device to an optical element holding member in the present invention is not limited to the application like that in the first embodiment which is directly concerned in the driving operation of a forward/rearward moving member, and the biasing device can also be used to eliminate backlash, just like the torsion spring 138. As a drive mechanism for driving a holding member such as the lens frame 151, the present invention is not limited solely to the above described particular structure using a combination of a groove and a projection like a combination of the lead groove 136 and the guide pin 151b; for instance, a structure using a face cam (end-face cam) or the like is possible. In short, the present invention is widely applicable so long as the drive mechanism is of a type that is required to eliminate backlash between a guide surface and a follower which is in sliding contact with the guide surface.

The torsion spring 38 that is made of a single torsion spring in the above described first embodiment is the biasing device which biases the third lens group frame 51, and the torsion spring 138 that is made of a single torsion spring in the above described second embodiment is the biasing device which biases the lens frame 151. However, the biasing device is not limited to such a single torsion spring if the biasing device satisfies the requirement that the biasing device gives a biasing force to an optical element holding member (51 or 151) via a swingable force-applied portion (arm) capable of swinging about the swing axis which is substantially orthogonal to the optical axis of the optical element held by the optical element holding member.

Third through fifth embodiments of the optical element position control mechanism that use different biasing devices will be hereinafter discussed with reference to FIGS. 17 through 21. Each embodiment which will be discussed below is similar in structure to the first embodiment except for the biasing device and the structure associated therewith, and elements which are similar to those of the first embodiment of the optical element position control mechanism are designated by the same reference numerals and given the same member names.

Figure 17:
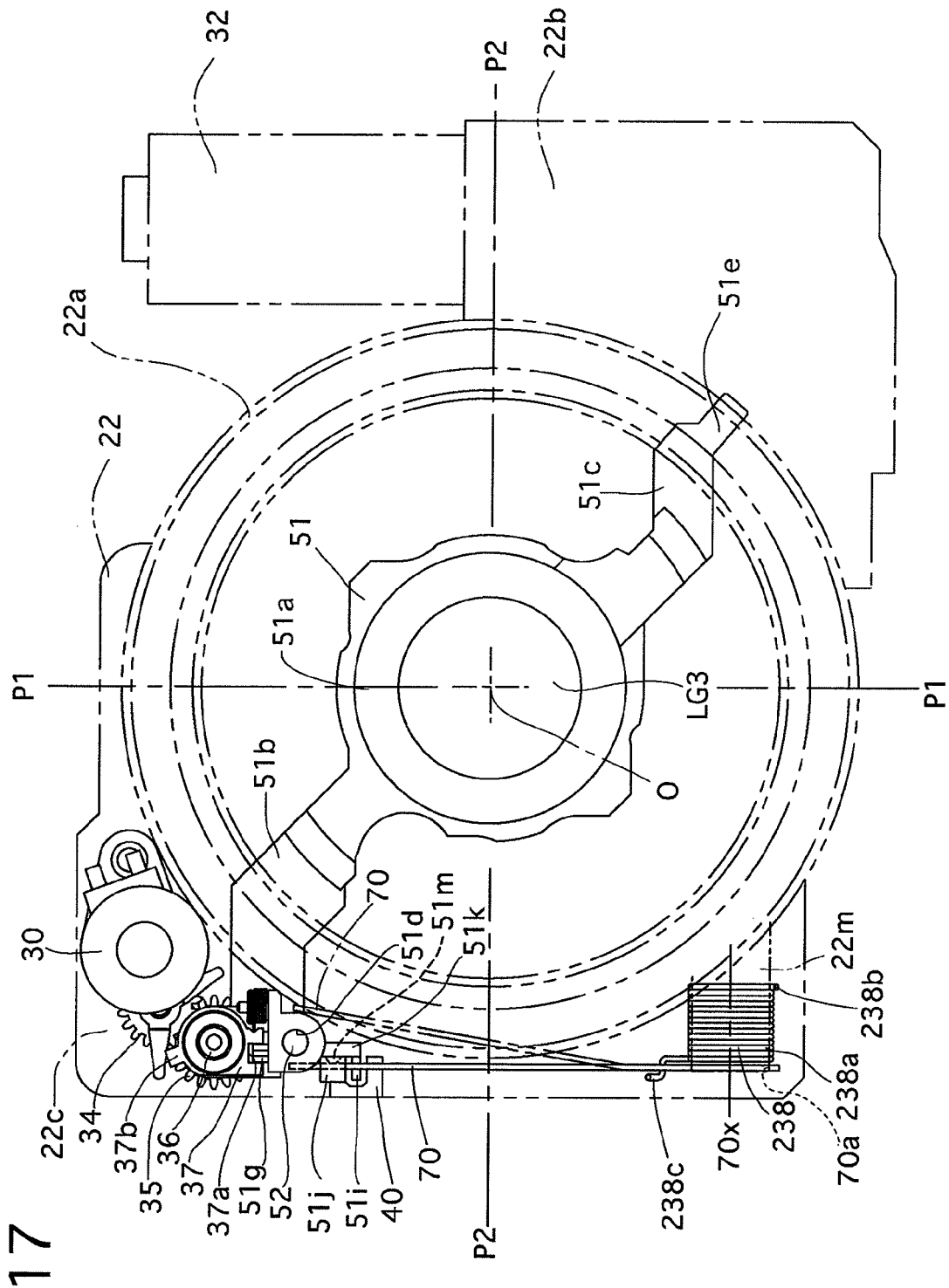
FIG. 17 is a front elevational view of a third embodiment of the optical element position control mechanism, mainly showing the third lens group frame and the position control mechanism therefor, wherein a combination of a lever and a torsion spring is used as a biasing device for biasing the third lens group frame.
Figure 18:
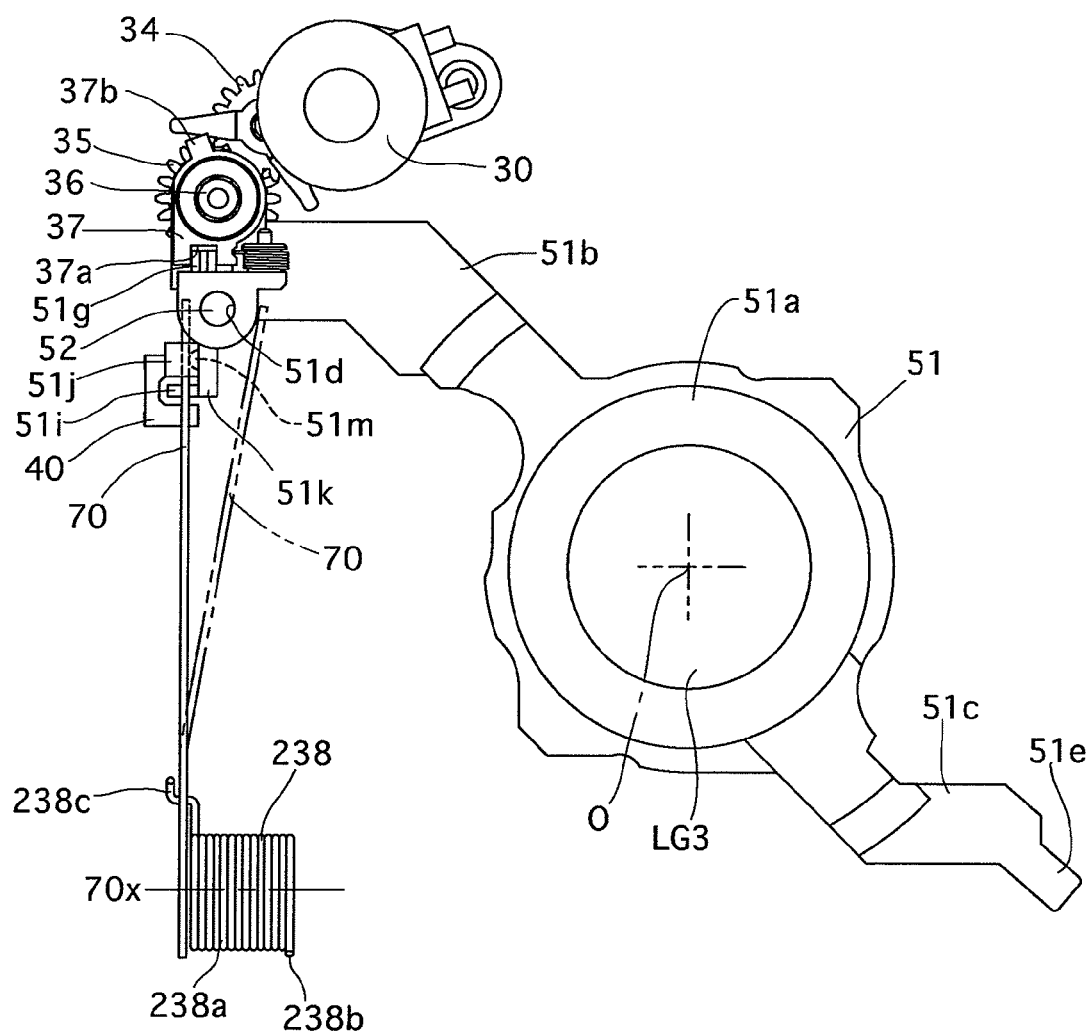
FIG. 18 is a front elevational view of the third lens group frame and the position control mechanism therefor that are shown in FIG. 17.
Figure 19:
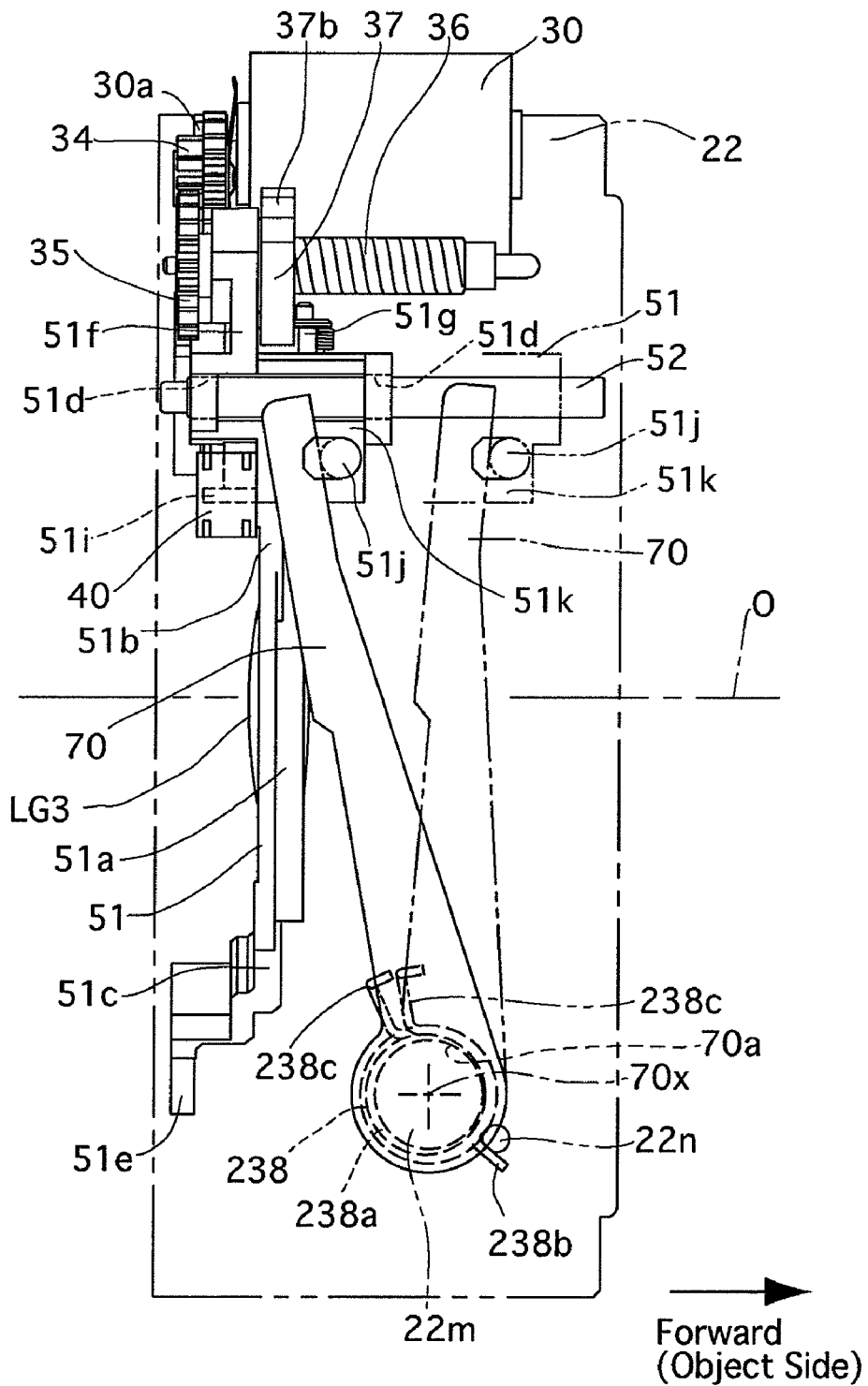
FIG. 19 is a side elevational view of a third embodiment of the optical element position control mechanism, which is configured to control the position of the third lens group frame, showing the operations of the lever and the torsion spring.

In the third embodiment shown in FIGS. 17 through 19, the biasing device for biasing the third lens group frame 51 is composed of a combination of swing lever (arm/lever) 70 and a torsion spring (lever biasing member) 238. The housing 22 is provided with a swing support projection 22m which projects laterally from the housing 22 (so that the axis of the swing support projection 22m extends in a direction substantially orthogonal to the vertical plane P1), and the swing lever 70 is provided at one end thereof with a shaft hole 70a into which the swing support projection 22m is inserted so that the swing lever 70 is freely rotatable about the swing support projection 22m and swingable about a swing axis 70x (fulcrum) which is substantially orthogonal to the optical axis O and substantially coincident with the axis of the swing support projection 22m. The other end (free end) of the swing lever 70 engages with a lever engaging projection 51j formed on the third lens group frame 51. The coiled portion 238a of the torsion spring 238 is fitted on the swing support projection 22m to be supported by the outer peripheral surface of the swing support projection 22m. The torsion spring 238 biases the swing lever 70 clockwise with respect to FIG. 19 with a support arm portion 238b and a biasing arm portion 238c being hooked onto a fixed projection 22n of the housing 22 and a portion of the swing lever 70 in the vicinity of the swing support projection 22m, respectively, wherein each of the support arm portion 238b and the biasing arm portion 238c extends radially outwards from the coiled portion 238a. The biasing force of the torsion spring 238 on the swing lever 70 is exerted in a manner so as to press the third lens group frame 51 forward in the optical axis direction via the lever engaging projection 51j.

The swing lever 70 itself has no resiliency in the swinging direction thereof. However, with a biasing force given to the swing lever 70 from the torsion spring 238, a combination of the biasing arm portion 238c of the torsion spring 238 and the swing lever 70 substantially function as a swingable force-applied portion, similar to the biasing arm portion 38c of the torsion spring 38 in the first embodiment of the optical element position control mechanism or the biasing arm portion 138c of the biasing spring 138 in the second embodiment of the optical element position control mechanism. Therefore, just like the biasing devices of the previous (first and second) embodiments, the load on the AF motor 30 can be reduced by reducing the load variation in the force-applied state to the third lens group frame 51 even through the biasing device can be arranged in a space-saving manner in the optical axis direction. Unlike the third embodiment, it is possible to make the coiled portion 238a of the torsion spring 238 supported by a support portion different from the swing support projection 22m of the swing lever 70.

Figure 20:
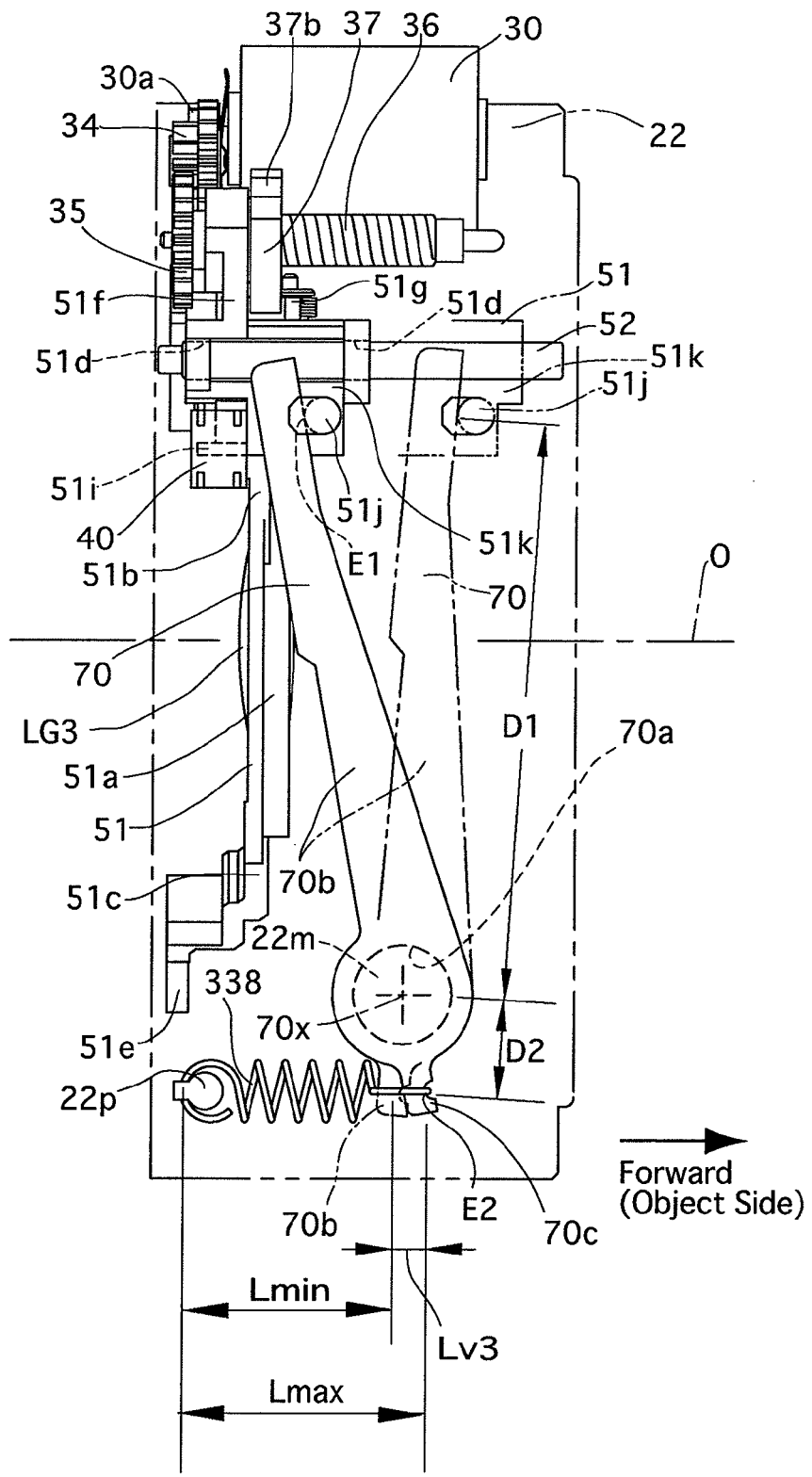
FIG. 20 is a side elevational view of a fourth embodiment of the optical element position control mechanism, which is configured to control the position of the third lens group frame, wherein a combination of a lever and an extension spring is used as a biasing device for biasing the third lens group frame.

A fourth embodiment shown in FIG. 20 is similar to the third embodiment shown in FIGS. 17 through 19 except that the torsion spring 238 is replaced by an extension spring (lever biasing member) 338 as a biasing member for biasing the swing lever 70 that is adopted in the third embodiment. The swing lever 70 is provided with a main arm 70b which extends from the pivoted portion (shaft hole 70a) of the swing lever 70 in a direction to engage with the lever engaging projection 51j of the third lens group frame 51, and is further provided with a spring-hooked arm 70c which extends from the pivoted portion (shaft hole 70a) of the swing lever 70 in a direction substantially opposite to the direction of extension of the main arm 70b. The extension spring 338 is installed so that the axis thereof extends substantially parallel to the optical axis O with one and the other ends of the extension spring 338 being hooked on the spring-hooked arm 70c and a spring hook 22p formed on the housing 22, respectively. In the swing lever 70, a distance D1 from the swing axis 70x to an engaging portion El of the swing lever 70 which engages with the lever engaging projection 51j is greater than a distance D2 from the swing axis 70x to an engaging portion E2 of the swing lever 70 which engages with the extension spring 338; namely, D1>D2. Due to the ratio (lever ratio) between the length of the main arm 70b and the spring-hooked arm 70c, the amount of movement of the engaging portion E1 on the main arm 70b (the amount of rotation of the engaging portion E1 about the swing axis 70x) per unit of movement of the third lens group frame 51 in the optical axis direction is greater than the amount of movement the engaging portion E2 on the spring-hooked arm 70c (the amount of rotation of the engaging portion E2 about the swing axis 70x) per unit of movement of the third lens group frame 51 in the optical axis direction. Consequently, as can be understood upon comparison between FIG. 13 and FIG. 20, a displacement Lv3 between the minimum length Lmin and the maximum length Lmax of the extension spring 338 in a force-applied state to the third lens group frame 51 is smaller than the displacement Lv2 of the comparative example shown in FIG. 13, so that the load variation can be reduced to a smaller degree than the case of using a single extension spring as a biasing device for biasing the third lens group frame 51, which makes it possible to lighten the load on the AF motor 30 by reducing the maximum load.

Figure 21:
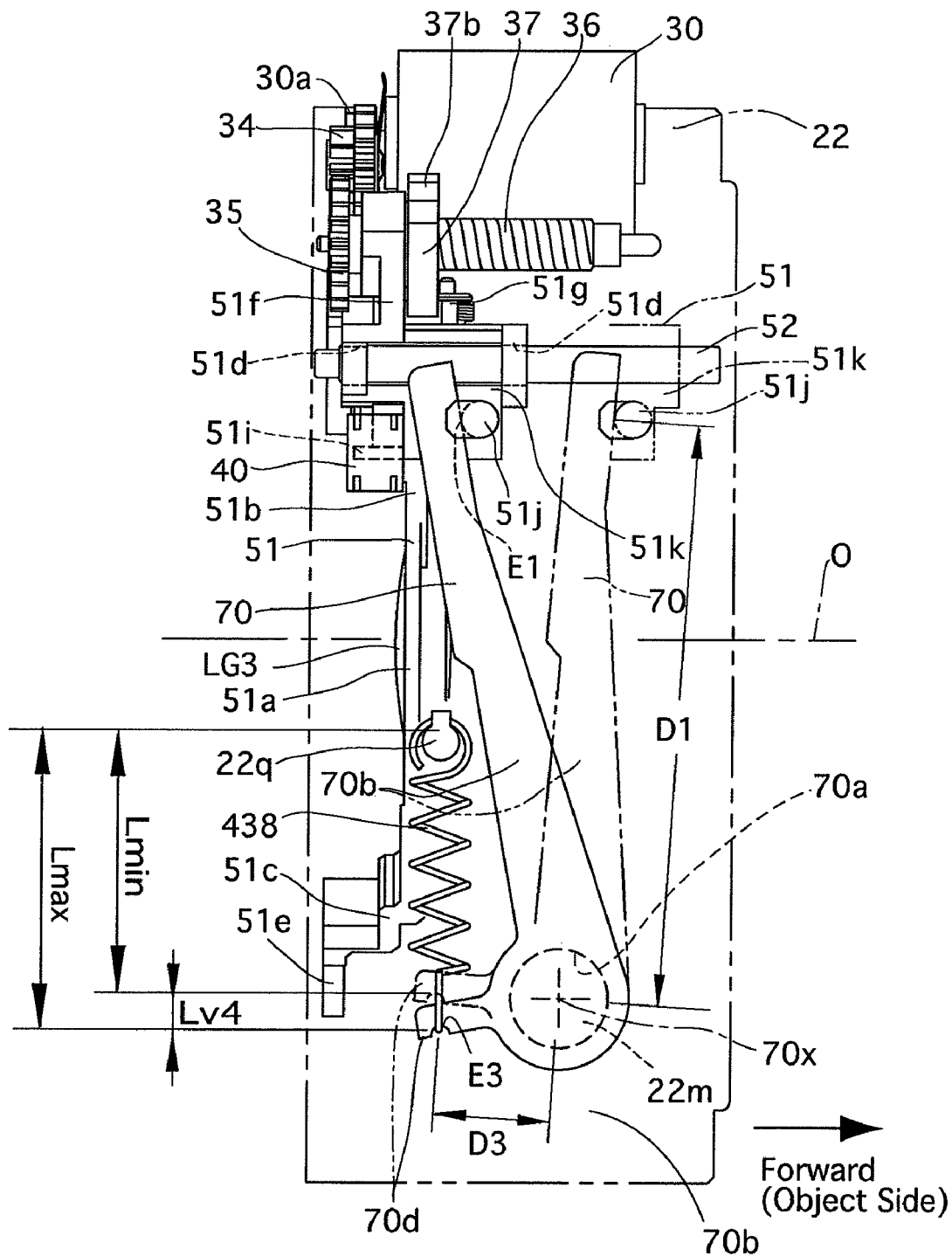
FIG. 21 is a side elevational view of a fifth embodiment of the optical element position control mechanism, which is configured to control the position of the third lens group frame, wherein a combination of a lever and an extension spring is used as a biasing device for biasing the third lens group frame.

A fifth embodiment shown in FIG. 21 is similar to the fourth embodiment shown in FIG. 20 except that the extension spring 338 of the fourth embodiment is replaced by an extension spring (lever biasing member) 438 which is different in tensile direction from the extension spring 338. The swing lever 70 is provided with a spring-hooked arm 70d which projects from the pivoted portion (shaft hole 70a) of the swing lever 70 in a direction substantially orthogonal to the direction of extension of the main arm 70b, i.e., at a substantially right angle relative to the main arm 70b. The extension spring 438 is installed so that the axis thereof extends substantially in the vertical direction of the zoom lens barrel, that corresponds to the direction of elongation of the main arm 70b, with one end of the extension spring 438 being hooked onto the spring-hooked arm 70d and the other end of the extension spring 438 being hooked onto a spring hook 22q formed on the housing 22. In the swing lever 70, the distance D1 from the swing axis 70x to an engaging portion E1 of the swing lever 70 which engages with the lever engaging projection 51j is greater than a distance D3 from the swing axis 70x to an engaging portion E3 of the swing lever 70 which engages with the extension spring 438, namely, D1>D3. Accordingly, when the third lens group frame 51 moves forward and rearward in the optical axis direction, the amount of movement of the engaging portion E1 on the main arm 70b (the amount of rotation of the engaging portion E1 about the swing axis 70x) is greater than the amount of movement the engaging portion E3 on the spring-hooked arm 70d (the amount of rotation of the engaging portion E3 about the swing axis 70x). Consequently, the displacement Lv4 between the minimum length Lmin and the maximum length Lmax of the extension spring 438 in a force-applied state to the third lens group frame 51 is small (smaller than the displacement Lv2 of the comparative example shown in FIG. 13), so that the load variation can be reduced to a smaller degree than the case of using a single extension spring as a biasing device for biasing the third lens group frame 51, which makes it possible to lighten the load on the AF motor 30 by reducing the maximum load.

In the fourth embodiment, it is desirable that the ratio between the length of the main arm 70b of the swing lever 70

(D1) and the length of the spring-hooked arm 70c (D2) satisfy the following conditional expression: D2<D1/2. Likewise, in the fifth embodiment, it is desirable that the ratio between the length of the main arm 70b of the swing lever 70 (D1) and the length of the spring-hooked arm 70d (D3) satisfy the following conditional expression: D3<D1/2.

As can be understood from the fourth and fifth embodiments, with the swing lever 70 provided as a biasing device for biasing the third lens group frame 51, the load variation of the biasing device can be reduced by a structure which is designed compact in the optical axis direction even if an extension spring which expands and contracts in the axial direction thereof is adopted instead of a torsion spring. From this point of view, a similar effect is obtained even if the extension spring 338 or 438 in the fourth or fifth embodiment is replaced by a biasing device composed of a combination of a compression spring and a swing lever.

In addition, in each of the above described embodiments, the biasing device which biases the third lens group frame 51 or the lens frame 151 in a direction along the optical axis o to move the frame 51 or 151 in the same direction also imposes a load in a direction orthogonal to the moving direction of the frame 51 or 151 on the frame 51 or 151, which eliminates backlash of the frame 51 or 151 in the advancing/retracting movement guide mechanism.

Figure 11:
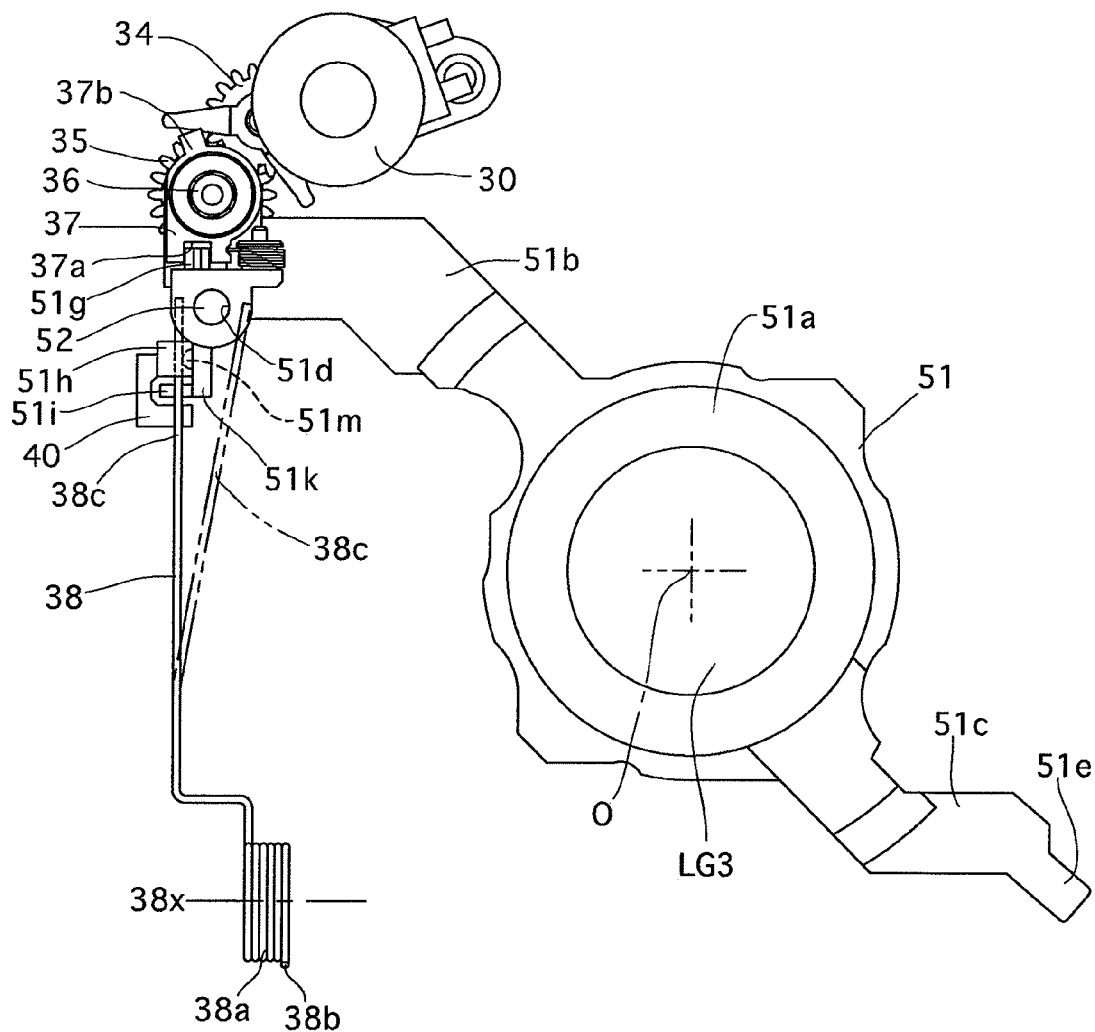
FIG. 11 is a front elevational view of the third lens group frame and the position control mechanism therefor that are shown in FIG. 10.

The biasing arm portion 38c of the torsion spring 38 in the first embodiment extends along a swing plane (defined by the swinging movement of the biasing arm portion 38c shown by a solid line in FIGS. 10 and 11) orthogonal to the swing axis 38x, and swings in the swing plane as described above when the third lens group frame 51 moves along the optical axis O in the force-applied state, in which the biasing arm portion 38c of the torsion spring 38 is engaged with the spring hook 51h. Note that the spring hook 51h is positioned within a swinging range of the biasing arm portion 38c defined by the radial length of the biasing arm portion 38c. When the biasing arm portion 38c of the torsion spring 38 is in a free state, in which the biasing arm portion 38c is not engaged with the spring hook 51h, the biasing arm portion 38c is inclined with respect to the swing plane (i.e., is positioned outside the swing plane) and has a shape inclined toward the optical axis O as shown by a two-dot chain line in FIGS. 10 and 11. When the biasing arm portion 38c is brought into the force-applied state, in which the biasing arm portion 38c of the torsion spring 38 is engaged with the spring hook 51h, the biasing arm portion 38c is resiliently deformed by being rotated counterclockwise with respect to FIGS. 10 and 11 until coming into contact with the upright wall portion 51k formed on the third lens group frame 51 (so that the biasing arm portion 38c coincides with the above described swing plane) to be prevented from returning to a free state. The upright wall portion 51k is formed in a flat shape substantially parallel to the swing plane of the biasing arm portion 38c, and the third lens group frame 51 is provided on the upright wall portion 51k with the semicircular-cross-sectional portion 51m which comes in contact with the biasing arm portion 38c. The spring hook 51h, which is formed on the third lens group frame 51 to project therefrom, is positioned in front of the semicircular-cross-sectional portion 51m.

Upon the biasing arm portion 38c being brought into contact with the upright wall portion 51k (the semicircular-cross-sectional portion 51m) while being resiliently deformed from a free state, the upright wall portion 51k of the third lens group frame 51 is biased rightward with respect to FIGS. 10 and 11 by the resiliency of the biasing arm portion 38c. The upright wall portion 51k is formed immediately below the pair of guide holes 51d that are formed in the vicinity of the radially outer end of the guide arm portion 51b, and the load on the upright wall portion 51k from the biasing arm portion 38c acts as a pressing force which urges the pair of guide holes 51d rightward with respect to FIGS. 10 and 11. As a result, the inner wall surfaces of the pair of guide holes 51d are pressed against the third lens group guide shaft 52 to thereby eliminate play between the third lens group guide shaft 52 and the pair of guide holes 51d in a direction orthogonal to the direction of movement of the third lens group frame 51 (direction along the optical axis O). In addition, a moment of force acts on the anti-rotation projection 51e and the linear guide groove 22f that are symmetrically positioned on the opposite side of the optical axis O from the pair of guide holes 51d and the third lens group guide shaft 52 so that the anti-rotation projection 51e is pressed against one of the opposed guide surfaces in the linear guide grooves 22f to eliminate backlash between the anti-rotation projection 51e and the linear guide groove 22f. Accordingly, the third lens group frame 51 is held with stability with no variations in position which may be caused by the clearance created in the advancing/retracting movement guide mechanism. This stable holding state is maintained even if the third lens group frame 51 is moved to any position since the biasing force imposed on the upright wall portion 51k from the biasing arm portion 38c is continuously imposed on the upright wall portion 51k as long as the torsion spring 38 remains in the force-applied state. This makes it possible to move the third lens group frame 51 smoothly with no backlash or noise being produced. Additionally, the positional accuracy of the third lens group frame 51 in a plane orthogonal to the optical axis O in a state where the third lens group frame 51 is stopped is improved. It should be noted that the upright wall portion 51k and the semicircular-cross-sectional portion 51m of the third lens group frame 51 also have a function to prevent the biasing arm portion 38c from coming in contact with any nearby parts other than the spring hook 51h upon the biasing arm portion 38c is brought into engagement with the spring hook 51h.

Since the torsion spring 38 (the biasing arm portion 38c) that biases the third lens group frame 51 in a direction along the optical axis O also serves as a biasing device which applies a biasing force to the upright wall portion 51k in a direction orthogonal to the direction of movement of the third lens group frame 51, backlash between the third lens group frame 51 and the elements for guiding the third lens group frame 51 in the optical axis direction such as the third lens group guide shaft 52 and the linear guide groove 22f can be eliminated by a simple and space-saving structure made of a small number of elements with no need to provide an independent biasing member used exclusively for eliminating the backlash.

Figure 16:
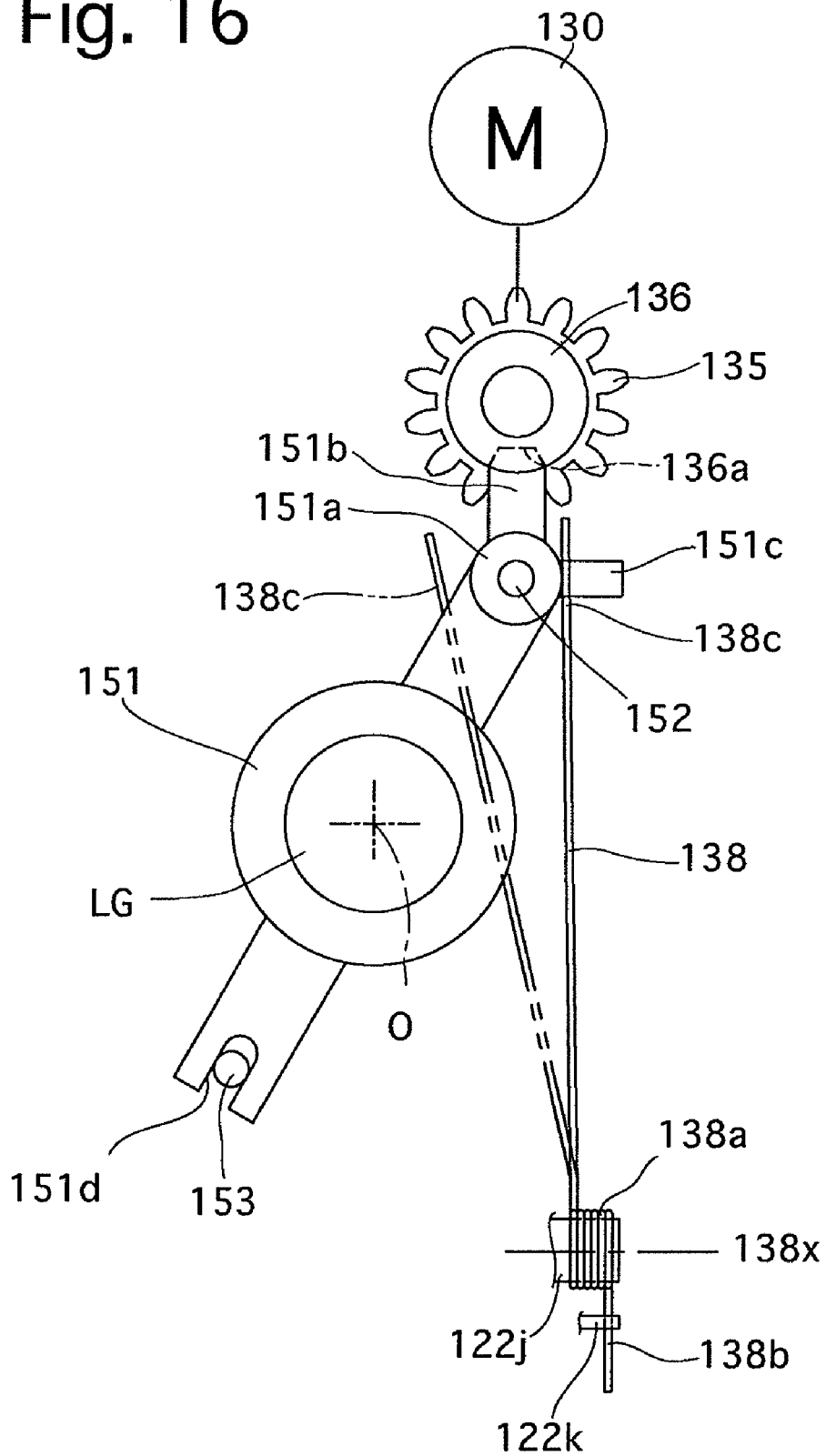
FIG. 16 is a front elevational view of the second embodiment of the optical element position control mechanism shown in FIG. 15.

Similar to the biasing arm portion 38c of the torsion spring 38 in the first embodiment, the biasing arm portion 138c of the torsion spring 138 in a free state (where the biasing arm portion 138c is not hooked onto the spring hook 151c) in the second embodiment also has a shape inclined toward the optical axis O with respect to the position of the biasing arm portion 138c in the swing plane (in the force-applied state shown by a solid line in FIG. 16) as shown by a two-dot chain line in FIG. 16. In addition, when the biasing arm portion 138c is brought into the force-applied state, in which the biasing arm portion 138c is hooked onto the spring hook 151c, the biasing arm portion 138c is resiliently deformed clockwise with respect to FIG. 16, and the resiliency of the biasing arm portion 138c causes the biasing arm portion 138c to press an outer surface portion (contacting portion) of the cylindrical portion 151a of the lens frame 151 leftward with respect to FIG. 16. This pressing force prevents the lens frame 151 from rattling relative to the guide shaft 152 and stabilizes the position of the lens group LG in a plane orthogonal to the optical axis O. Namely, the torsion spring 138 has the following two functions: the function of biasing the lens frame 151 in the direction of movement thereof and the function of biasing the lens frame 151 in a direction orthogonal to the direction of movement thereof, thus making it possible to hold the lens frame 151 with stability by a simple and space-saving structure constructed from a small number of elements.

The swing lever 70 in each of the third through fifth embodiments is also configured to impose a load on the third lens group frame 51 in a direction orthogonal to the direction of movement of the third lens group frame 51. Taking the swing lever 70 in the third embodiment as a representative of the swing lever in each of the third through fifth embodiments, the swing lever 70 is resiliently deformable in a direction orthogonal to the optical axis O, and the swing lever 70 in a free state (where the swing lever 70 is not hooked on the spring hook 51h) has a shape inclined toward the optical axis O with respect to the position of the swing lever 70 in the swing plane in the force-applied state (shown by a solid line in FIGS. 17 and 18) as shown by a two-dot chain line in FIGS. 17 and 18. In addition, when the swing lever 70 is brought into the force-applied state, in which the swing lever 70 is hooked onto the spring hook 51h, the swing lever 70 is resiliently deformed counterclockwise with respect to FIGS. 17 and 18 to be brought into contact with the upright wall portion 51k (the semicircular-cross-sectional portion 51m) of the third lens group frame 51, and the swing lever 70 presses the upright wall portion 51k rightward with respect to FIGS. 17 and 18 by the resiliency of the swing lever 70. This pressing force prevents the third lens group frame 51 from rattling relative to the third lens group guide shaft 52 and the linear guide groove 22f and stabilizes the position of the third lens group LG3 in a plane orthogonal to the optical axis O. Namely, the swing lever 70 has the following two functions: the function of biasing the third lens group frame 51 in the direction of movement thereof by the biasing force of the torsion spring 238 and the function of biasing the third lens group frame 51 in a direction orthogonal to the direction of movement thereof, thus making it possible to hold the third lens group frame 51 with stability by a simple and space-saving structure made of a small number of elements. Although the details will not be discussed in the following descriptions, the swing lever 70 in each of the fourth and fifth embodiments also has the multiple function of biasing the third lens group frame 51 in two different directions.

FIGS. 22 through 26 show modified embodiments, each of which is structured to be capable of giving a biasing force to a holding member which holds an optical element in a direction orthogonal to the direction of movement of the holding member in a more effective manner. These modified embodiments are substantially identical to the above described first embodiment except several portions are different in structure from those of the first embodiment, and the descriptions of elements which are similar to those of the first embodiment are omitted from the following descriptions.

Figure 22:
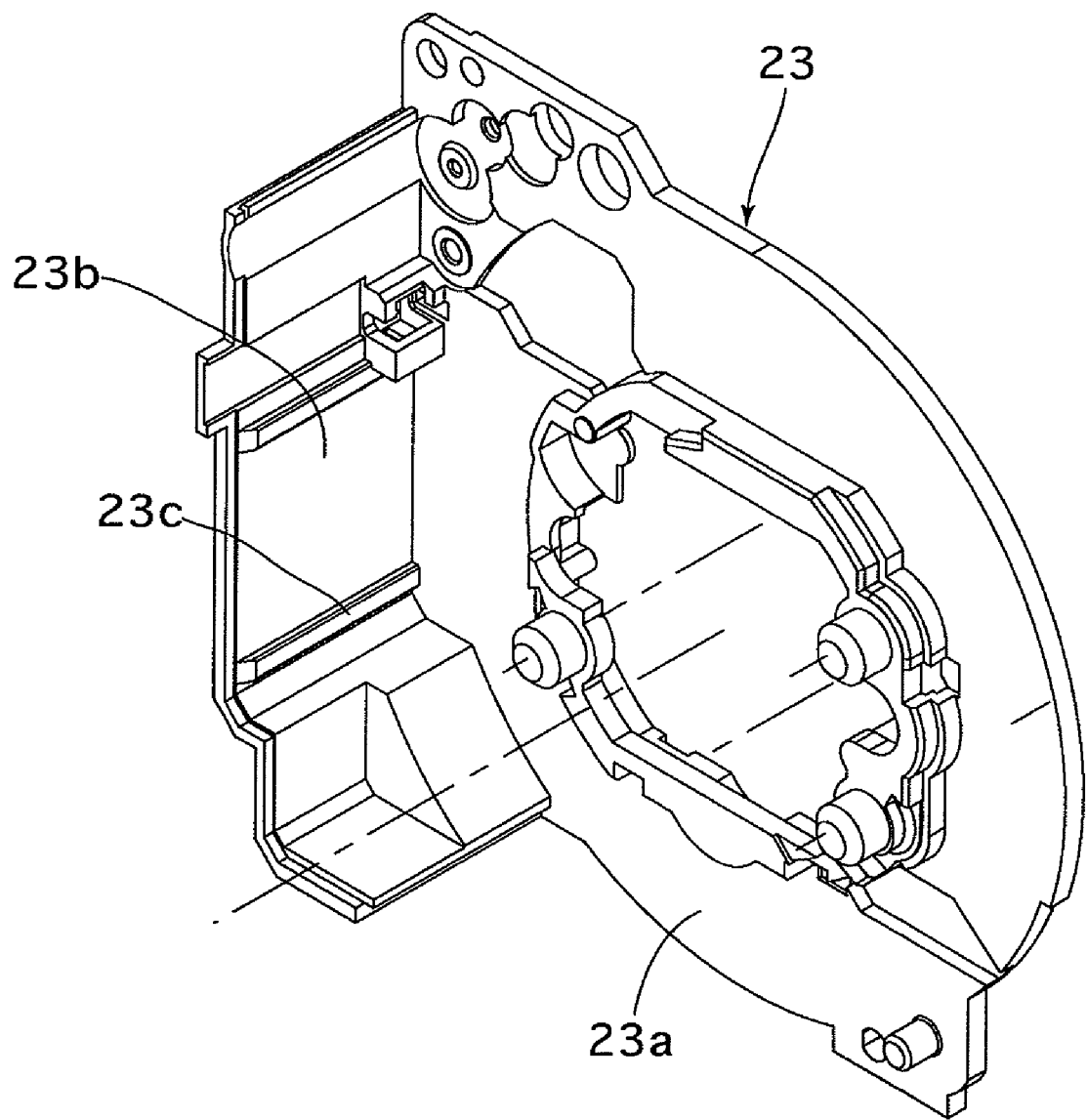
FIG. 22 is a perspective view of the image-pickup device holder as an element of a first modified embodiment of the optical element position control mechanism, wherein the image-pickup device holder is provided on a protective wall portion thereof with a pressing portion which presses the biasing arm portion of the third-lens-group biasing spring.
Figure 23:
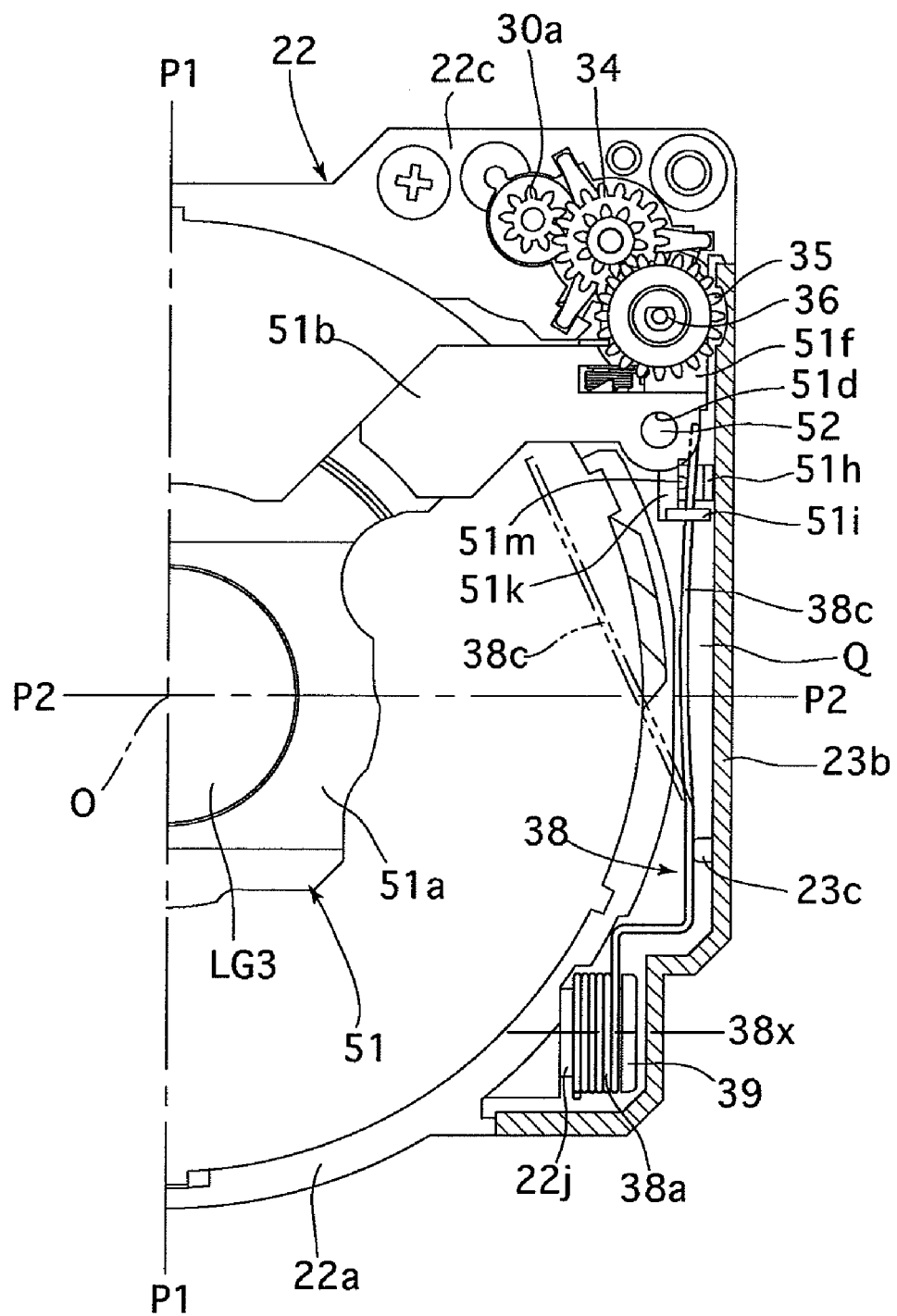
FIG. 23 is a rear elevational view, partly in cross section, of a portion of the first modified embodiment of the optical element position control mechanism, showing a state where the biasing arm portion of the third-lens-group biasing spring is pressed by the pressing portion of the protective wall portion of the image-pickup device holder.

FIGS. 22 and 23 show a first modified embodiment. In this embodiment, the image-pickup device holder 23 is provided with a main body portion 23a and a protective wall portion (pressing device/stationary wall member/outer wall member) 23b. The main body portion 23a holds the image-pickup device 24 and closes the back of the cylindrical portion (pressing device/stationary wall member/inner wall member/inner cylindrical member) 22a of the housing 22, and the protective wall portion 23b extends forward in the optical axis direction from the main body portion 23a. The protective wall portion 23b faces an outer peripheral surface of the cylindrical portion 22a to form an accommodation space Q between the protective wall portion 23b and the outer peripheral surface of the cylindrical portion 22a. The torsion spring 38 is held in the accommodation space Q. As described above, the biasing arm portion 38c of the torsion spring 38 in a free state has a shape inclined toward the optical axis O as shown by a two-dot chain line in FIG. 23, and is resiliently deformed as shown by a solid line in FIG. 23 when in the force-applied state, in which the biasing arm portion 38c is engaged with the spring hook 51h. A spring pressing portion (pressing projection) 23c which is in pressing contact with the biasing arm portion 38c in the force-applied state is formed on the protective wall portion 23b of the back wall 23. As shown in FIG. 22, the spring pressing portion 23c is formed on a surface of the protective wall portion 23b facing the accommodation space Q (i.e., facing a surface of the projective wall portion 23b which faces an outer peripheral surface of the cylindrical portion 22a) to have the shape of a rib-like projection elongated in the optical axis direction. The spring pressing portion 23c remains in contact with the biasing arm portion 38c wherever the third lens group frame 51 is positioned within the range of movement thereof.

The amount of projection of the spring pressing portion 23c is determined so that the spring pressing portion 23c presses the biasing arm portion 38c in a direction toward the upright wall portion 51k (the semicircular-cross-sectional portion 51m) when the biasing arm portion 38c is hooked onto the spring hook 51h. Therefore, it is possible to cause the biasing force of the torsion spring 38, in a direction orthogonal to the direction of movement of the third lens group frame 51, to reliably act on the third lens group frame 51 and to satisfactorily eliminate backlash between the third lens group guide shaft 52 (which serves as an advancing/retracting movement guide member of the third lens group frame 51) and the guide hole 51d.

Figure 24:
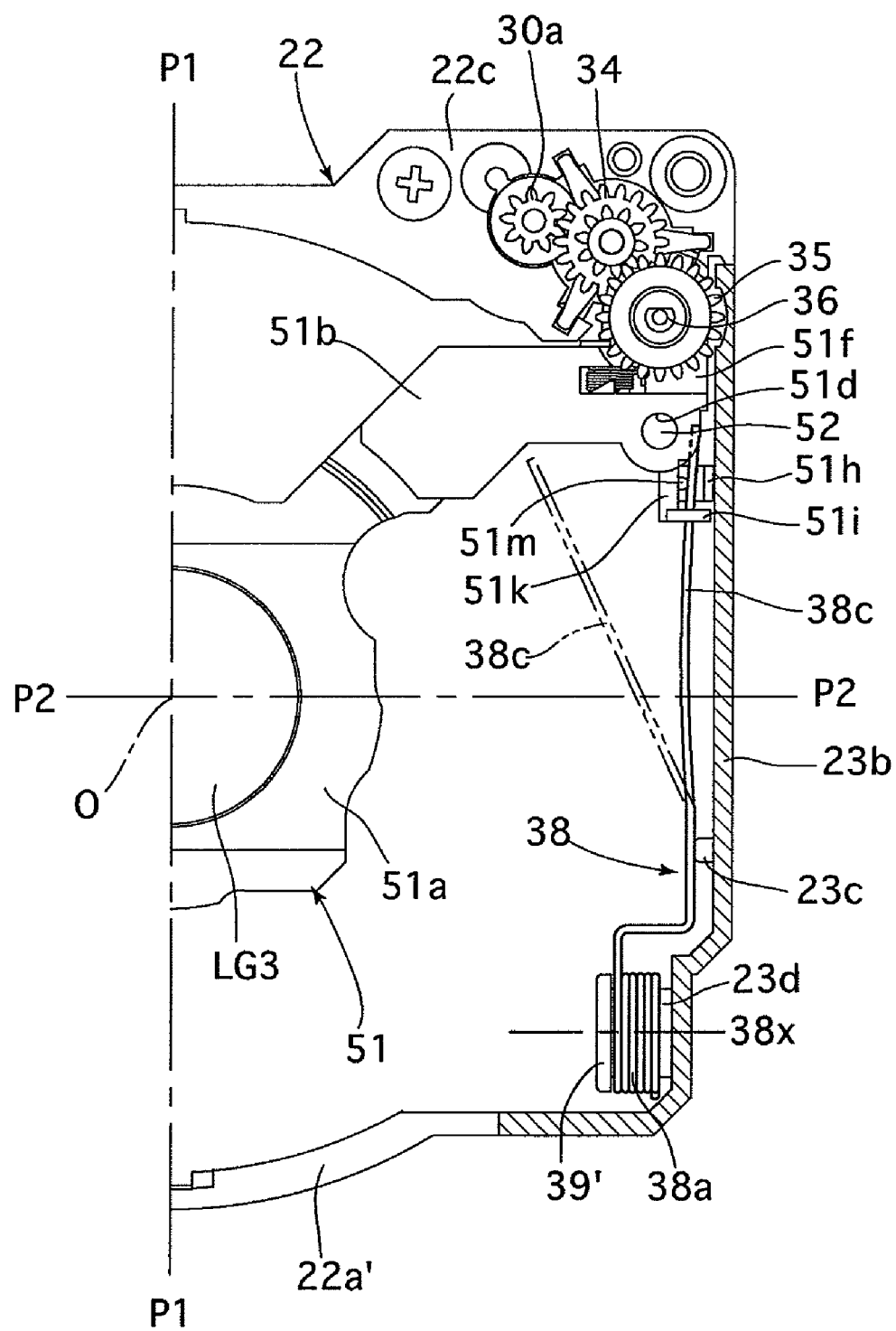
FIG. 24 is a rear elevational view, partly in cross section, of a portion of a second modified embodiment of the optical element position control mechanism, showing a state where the biasing arm portion of the third-lens-group biasing spring is pressed by the pressing portion of the protective wall portion of the image-pickup device holder.

FIG. 24 shows a second modified embodiment. This modified embodiment is similar to the first modified embodiment in that a pressing force by the spring pressing portion 23c that is formed on the protective wall portion 23b of the image-pickup device holder 23 is imposed on the biasing arm portion 38c of the torsion spring 38 in the force-applied state shown by a slid line shown in FIG. 24. However, the second modified embodiment is different from the first modified embodiment in that a cylindrical portion 22a' of the housing 22 in the second modified embodiment is not a complete cylindrical body, i.e., the cylindrical portion 22a' is an incomplete cylindrical body in which a portion thereof, corresponding to a portion of the cylindrical portion 22a that faces the protective wall portion 23b, is missing. Due to this modification, the coiled portion 38a of the torsion spring 38 is fitted on a spring hook 23d formed on the protective wall portion 23b, not on the cylindrical portion 22a', to be supported by the spring hook 23d, and a spring fixing screw 39' is screwed in the spring hook 23d to prevent the coiled portion 38a from coming off the spring hook 23d. In this manner, the tubular member (the cylindrical portion 22a') positioned on an inner side with respect to the biasing device (the torsion spring 38) (i.e., positioned farther from the protective wall portion 23b than the biasing device) does not necessarily have to be completely cylindrical in shape; in this case, it is effective to form a pressing portion on an outer wall member (the protective wall portion 23b) for pressing the biasing device (torsion spring 38).

Figure 25:
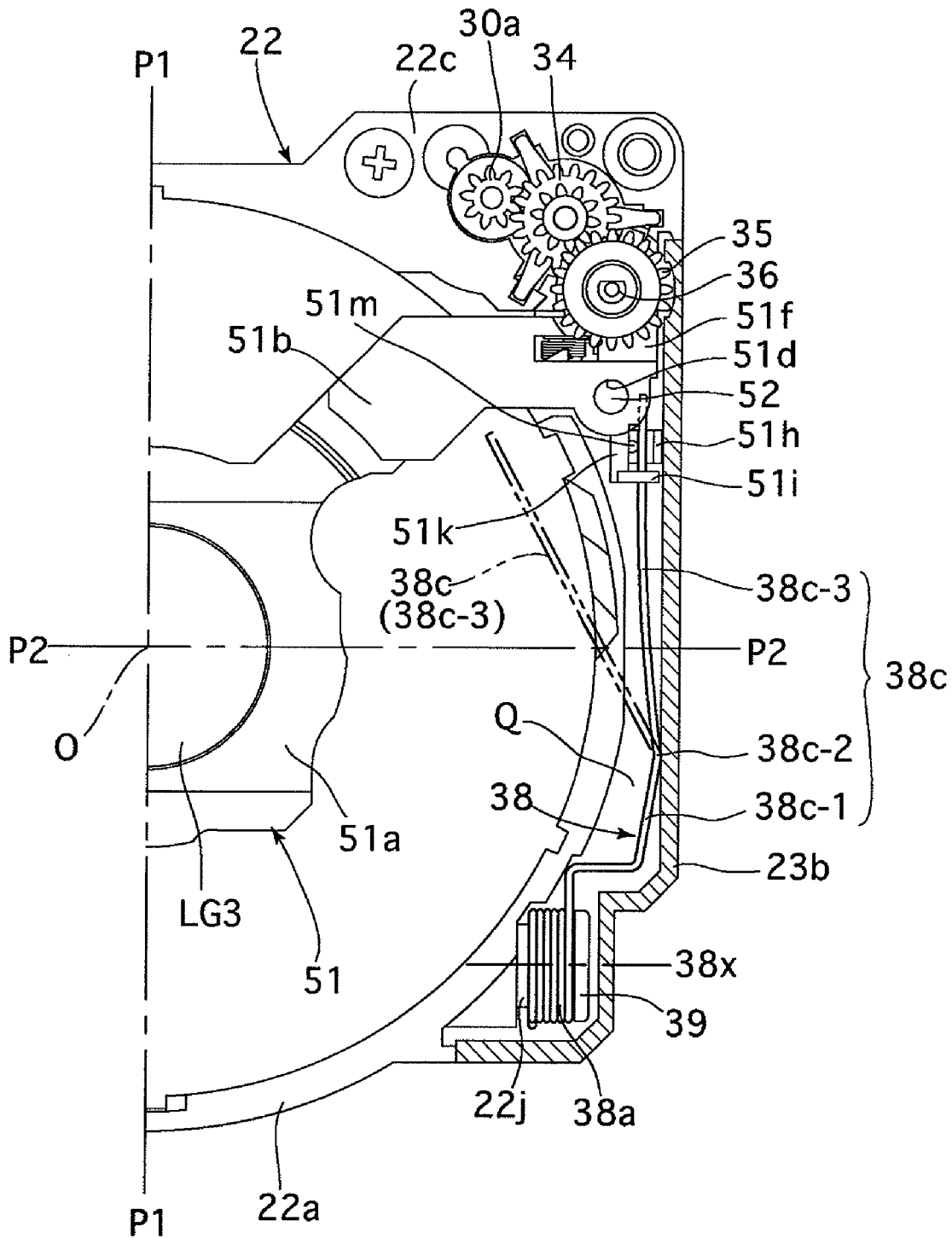
FIG. 25 is a rear elevational view, partly in cross section, of a portion of a third modified embodiment of the optical element position control mechanism, showing a state where a bent portion formed on the biasing arm portion of the third-lens-group biasing spring is pressed by the protective wall portion of the image-pickup device holder.
Figure 26:
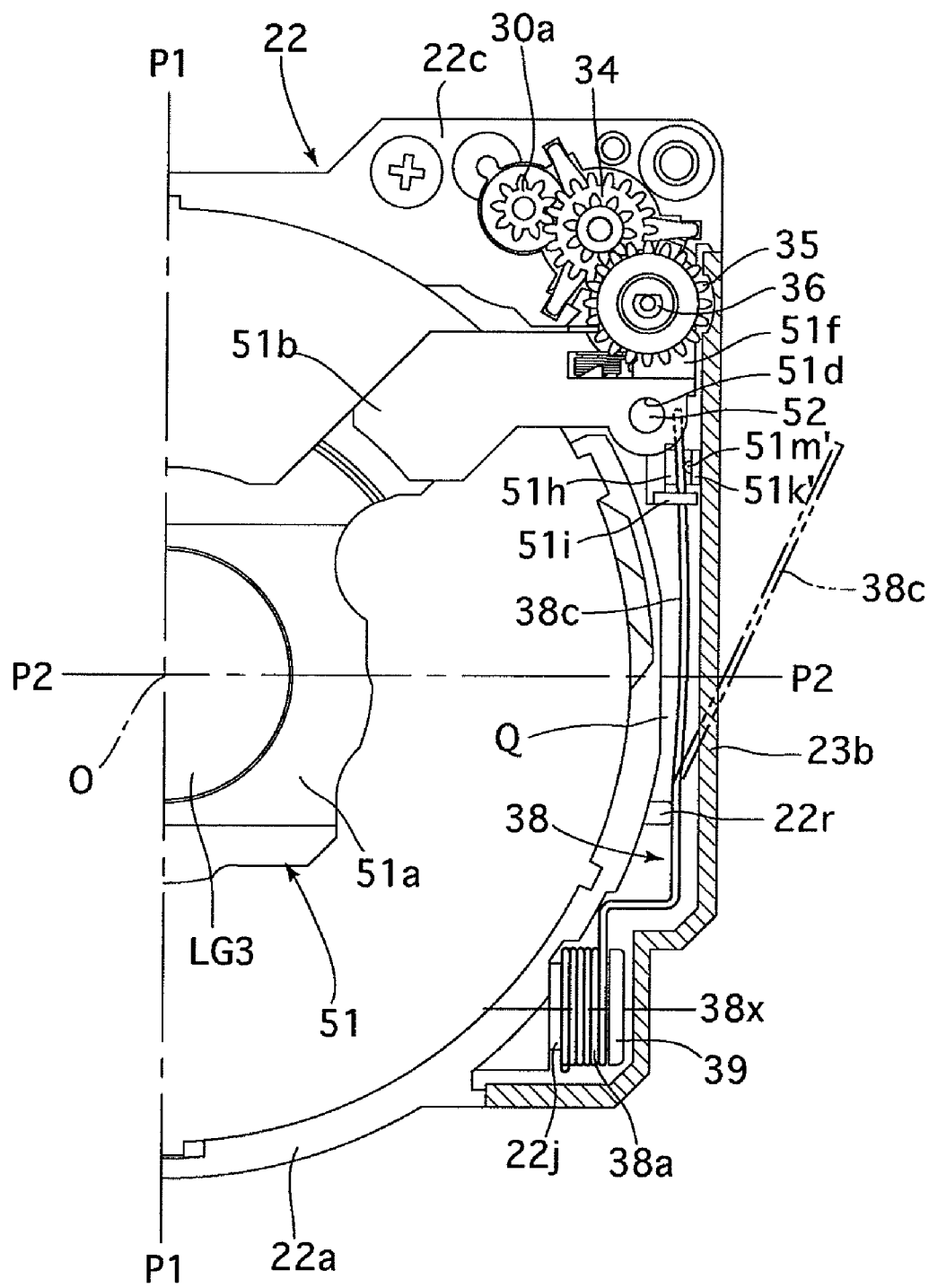
FIG. 26 is a rear elevational view, partly in cross section, of a portion of a fourth modified embodiment of the optical element position control mechanism, showing the biasing arm portion of the third-lens-group biasing spring is pressed by a pressing portion formed on the cylindrical portion of a housing.

FIG. 25 shows a third modified embodiment. The third modified embodiment is similar to each of the above described first and second modified embodiments in that the biasing arm portion 38c of the torsion spring 38 is pressed against the protective wall portion 23b of the image-pickup device holder 23 to make a biasing force in a direction orthogonal to the direction of movement of the third lens group frame 51 securely act on the third lens group frame 51; however, the third modified embodiment is different from each of the first and second modified embodiments in that a similar biasing force is securely made to act on the third lens group frame 51 by utilizing the particular shape of the biasing arm portion 38c in the third modified embodiment without utilizing a spring pressing portion 23c. Specifically, the biasing arm portion 38c of the torsion spring 38 in the third modified embodiment is provided with an outwardly extending portion (first extending portion) 38c-1, a bent portion 38c-2 and an inwardly extending portion (second extending portion) 38c-3 which are formed to bulge toward the protective wall portion 23b at the bent portion 38c-2. The outwardly extending portion 38c-1 extends obliquely toward the protective wall portion 23b from the coiled portion 38a (in a direction away from the cylindrical portion 22a), the bent portion 38c-2 is continuously formed FIG. 26 shows a fourth modified embodiment. In this modified embodiment, a pressing portion which presses against the biasing arm portion 38c of the torsion spring 38 is formed on the cylindrical portion 22a of the housing 22, not on the protective wall portion 23b of the image-pickup device holder 23, contrary to the first through third modified embodiments. In the fourth modified embodiment, the biasing direction of the biasing arm portion 38c to an advancing/retracting movement guide portion (the third lens group guide shaft 52 and the guide hole 51d) of the third lens group frame 51 is the reverse to that in the case shown in FIGS. 23 through 25. When the biasing arm portion 38c is resiliently deformed to come into the force-applied state shown by a solid line in FIG. 26 from a free state shown by a two-dot chain line in FIG. 26, the biasing arm portion 38c presses an upright wall portion 51k' (a semicircular-cross-sectional portion 51m') formed at an end of the spring hook 51h in a direction away from the optical axis O. The cylindrical portion 22a is provided on an outer peripheral surface thereof with a spring pressing portion (pressing projection) 22r which projects into the accommodation space Q (in a direction to approach the protective wall portion 23b), and the spring pressing portion 22r presses the protective wall portion 23b in the force-applied state in a direction to approach the upright wall portion 51k' (the semicircular-cross-sectional portion 51m'). Accordingly, in this fourth modified embodiment, a biasing force in a direction orthogonal to the direction of the movement of the third lens group frame 51 can also be made to reliably act on the third lens group frame 51 by the biasing arm portion 38c of the torsion spring 38.

In an embodiment in which the biasing arm portion 38c is pressed by the cylindrical portion 22a, the biasing arm portion 38c can be formed to have a bent portion like the biasing arm portion 38c of the torsion spring 38 of the third modified embodiment. Namely, although the biasing arm portion 38c is bent to bulge toward the protective wall portion 23b in the embodiment shown in FIG. 25, it is possible that the biasing arm portion 38c be bent to bulge toward the cylindrical portion 22a to make the bent portion press against the cylindrical portion 22a. However, it is desirable that a specific pressing portion like the spring pressing portion 22r be formed on an outer peripheral surface of the cylindrical portion 22a to secure stability when the bent portion of the biasing arm portion 38c is pressed against the cylindrical portion 22a.

Although each of the first through fourth modified embodiments has been applied to the biasing arm portion 38c of the torsion spring 38 of the first embodiment, each of the first through fourth modified embodiments can also be applied to the biasing arm portion 138c of the torsion spring 138 of the second embodiment and the swing levers 70 of the third through fifth embodiments. In the force-applied state of the biasing arm portion 138c or the swing lever 70, a greater effect on the prevention of backlash of the advancing/retracting movement guide member is obtained by pressing the biasing arm portion 138c or the swing lever 70 in a direction orthogonal to the direction of movement of the holding member (51 or 151) that is guided by the advancing/retracting movement guide member (the third lens group guide shaft 52/the guide shaft 152).

Although the above described embodiments according to the present invention have been discussed with reference to the accompanied drawings, the present invention is not limited solely to these particular embodiments. For instance, although an optical element moved forward and rearward in the optical axis direction is provided as a lens group for focusing in the above illustrated embodiments, the present invention is applicable to a position control mechanism for controlling the position of an optical element other than a lens group for focusing.

Although the support arm portion 38b of the torsion spring 38 in the first embodiment, the support arm portion 238b of the torsion spring 238 in the third embodiment, and one end of each of the extension springs 338 and 438 of the fourth and fifth embodiments are each engaged with a projection formed on the housing 22, the member on which this projection is formed is not limited to a stationary member such as the housing 22 and can be a movable member as long as the member on which the projection is formed is movable relative to at least the holding member corresponding to the third lens group frame 51. Likewise, the support member which pivots the lever 70 in the third through fifth embodiments is not limited to a stationary member such as the housing and can be a movable member as long as it is movable relative to at least the holding member corresponding to the third lens group frame 51.

In addition, in each of the above described embodiments, the biasing arm portion 38c of the torsion spring 38, the biasing arm portion 138c of the torsion spring 138 and the swing lever 70 all have a linear shape, and the biasing arm portion 38c of the torsion spring 38, the biasing arm portion 138c of the torsion spring 138 and the swing lever 70 are made to swing about the swing axes 38x, 138x and 70x in a fixed swing plane, respectively, in the force-applied state, in which the biasing arm portion 38c or 138c or the swing lever 70 is engaged with the third lens group frame 51 or the lens frame 151. However, in the present invention, the swingable force-applied portion (swingable portion) is not limited to such a linear-shaped member. For instance, like the bent-shaped biasing arm portion 38c shown in FIG. 25, the swingable force-applied portion can be formed into various shapes. If the swingable force-applied portion is not formed into a simple linear-shaped portion or is formed to be inclined to a direction orthogonal to the swing axis even in the force-applied state, the traveling path of the swingable force-applied portion will not simply lie in a plane. However, if attention is focused on a specific portion of the swingable force-applied portion, the swingable force-applied portion can be assumed to be moved in a fixed plane about the swing axis. In the present invention, a plane orthogonal to the swing axis in which the traveling path of this specific portion lies is defined as a swing plane.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical element position control mechanism comprising:
    an optical element holding member which holds an optical element of a plurality of optical elements of a photographing system;
    an advancing/retracting movement guide member which guides said optical element holding member in an optical axis direction of said photographing system to be movable in said optical axis direction;
    a biasing device including an arm, said arm being swingable about a swing axis which is substantially orthogonal to said optical axis and being engaged with said optical element holding member,
    wherein said biasing device simultaneously exerts via said arm both a biasing force in a direction of movement of said optical element holding member that is guided by said advancing/retracting movement guide member and a biasing force in a direction orthogonal to said direction of movement of said optical element holding member on said optical element holding member; and
    a rotational ring that rotates to move at least one of said optical elements, wherein said rotational ring is provided separately from said optical element held by said holding member, and wherein said biasing device is positioned radially outside said rotational ring.

2. The optical element position control mechanism according to claim 1, wherein said biasing device comprises a torsion spring comprising:
    a coiled portion supported by a support member provided separately from said optical element holding member, a central axis of said coiled portion being substantially coincident with said swing axis;
    a first arm portion which constitutes said arm and extends radially outwards from said coiled portion to be engaged with said optical element holding member; and
    a second arm portion which extends radially outward from said coiled portion to be engaged with said support member,
    wherein said torsion spring varies an amount of resilient deformation thereof in a direction of rotation about said swing axis in accordance with movement of said optical element holding member,
    wherein said first arm portion extends along a swing plane defined by a swing motion thereof about said swing axis, in a force-applied state of said biasing device in which said first arm is engaged with said optical element holding member,
    wherein said first arm portion is positioned outside said swing plane in a free state of said biasing device in which said first arm is disengaged from said optical element holding member, and
    wherein said first arm portion is resiliently deformed in a direction so as to coincide with said swing plane when said biasing device is brought into said force-applied state from said free state.

3. The optical element position control mechanism according to claim 2, wherein said optical element position control mechanism is incorporated in a photographing lens unit, said support member constituting a stationary member of said photographing lens unit.

4. The optical element position control mechanism according to claim 1, wherein said arm of said biasing device comprises a lever pivoted at one end thereof on a support member, that is provided separately from said optical element holding member, the other end of said lever being engaged with said optical element holding member, and
    wherein said biasing device includes a lever biasing member for biasing said lever in one of forward and reverse rotational directions about said swing axis,
    wherein said lever extends along a swing plane defined by swing motion thereof about said swing axis, in a force-applied state of said biasing device in which said lever is engaged with said optical element holding member,
    wherein said lever is positioned outside said swing plane in a free state of said biasing device in which said lever is disengaged from said optical element holding member, and
    wherein said lever is resiliently deformed in a direction to approach said swing plane when said biasing device is brought into said force-applied state from said free state.

5. The optical element position control mechanism according to claim 1, wherein said advancing/retracting movement guide member comprises a guide shaft, an axis of which extends in said optical axis direction,
    wherein said optical element holding member includes a guide hole into which said guide shaft is inserted to be slidable, and
    wherein said arm of said biasing device is in contact with a contacting portion in a close vicinity of said guide hole and presses said optical element holding member in a manner to cause an inner wall surface of said guide hole to press against said guide shaft.

6. The optical element position control mechanism according to claim 5, wherein said optical element holding member comprises a projection which projects from said contacting portion and is positioned within a swinging range of said arm of said biasing device to receive said biasing force in said direction of movement of said optical element holding member.

7. The optical element position control mechanism according to claim 1, further comprising a pressing device which presses said biasing device in a direction orthogonal to said direction of movement of said optical element holding member when said biasing device is in a force-applied state in which said arm is engaged with said optical element holding member.

8. The optical element position control mechanism according to claim 7, wherein said pressing device comprises a stationary wall member positioned at least one of inside and outside said biasing device, and
    wherein said arm of said biasing device is in contact with said stationary wall member to be pressed in said direction orthogonal to said direction of movement of said optical element holding member.

9. The optical element position control mechanism according to claim 8, wherein said stationary wall member comprises an outer wall member which is positioned outside said biasing device and presses said arm of said biasing device in a direction to approach said optical axis.

10. The optical element position control mechanism according to claim 8, wherein said stationary wall member comprises an inner wall portion positioned on the inner side of said biasing spring, said inner wall portion pressing said arm of said biasing device in a direction away from said optical axis.

11. The optical element position control mechanism according to claim 8, wherein said stationary wall member comprises a pressing projection which is in pressing contact with said arm of said biasing device.

12. The optical element position control mechanism according to claim 8, wherein said arm of said biasing device is formed to bulge toward said stationary wall member so that a bent portion of said biasing device comes in contact with said stationary wall member.

13. The optical element position control mechanism according to claim 12, wherein said arm of said biasing device comprises a first extending portion which extends to said bent portion toward said stationary wall member and a second extending portion which extends from said bent portion away from said stationary wall member.

14. The optical element position control mechanism according to claim 7, further comprising:

an inner cylindrical member positioned outside said optical element holding member; and an outer wall member positioned outside said optical element holding member so as to face said outer surface of said cylindrical member, wherein said biasing device is held between said inner cylindrical member and said outer wall member and said arm of said biasing device is in pressing contact with one of said inner cylindrical member and said outer wall member to be pressed in a direction orthogonal to said direction of movement of said optical element holding member.

15. The optical element position control mechanism according to claim 1, wherein said optical element holding member is guided linearly without rotating about said optical axis.

* * * * *